US012808681B2

(12) United States Patent
Lee et al.

(10) Patent No.: US 12,808,681 B2
(45) Date of Patent: Nov. 24, 2026

(54) DISPLAY DEVICE LINKED TO VEHICLE AND OPERATING METHOD THEREOF

(71) Applicant: LG ELECTRONICS INC., Seoul (KR)

(72) Inventors: Jinsang Lee, Seoul (KR); Sujin Kim, Seoul (KR); Byoungsu Kang, Seoul (KR); Jinho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 547 days.

(21) Appl. No.: 18/020,403

(22) PCT Filed: Dec. 28, 2021

(86) PCT No.: PCT/KR2021/020065
§ 371 (c)(1),
(2) Date: Feb. 8, 2023

(87) PCT Pub. No.: WO2022/154323
PCT Pub. Date: Jul. 21, 2022

(65) Prior Publication Data

US 2023/0296394 A1 Sep. 21, 2023

(30) Foreign Application Priority Data

Jan. 12, 2021 (KR) ........................ 10-2021-0004116

(51) Int. Cl.
*B60K 35/28* (2024.01)
*B60K 35/10* (2024.01)
(Continued)

(52) U.S. Cl.
CPC .......... *G01C 21/3682* (2013.01); *B60K 35/10* (2024.01); *B60K 35/22* (2024.01);
(Continued)

(58) Field of Classification Search
CPC ............ G01C 21/3638; G01C 21/3679; G01C 21/00; G06Q 30/0251; G06T 19/006; G06V 20/20; B60K 2360/177; B60K 35/00
(Continued)

(56) References Cited

U.S. PATENT DOCUMENTS 5,684,940 A 11/1997 Freeman et al.
5,948,040 A 9/1999 DeLorme et al.
(Continued)

FOREIGN PATENT DOCUMENTS

CN 111561938 8/2020
EP 3240258 11/2017
(Continued)

OTHER PUBLICATIONS

European Patent Office Application Serial No. 22739620.7, Search Report dated Mar. 7, 2025, 18 pages.
(Continued)

*Primary Examiner* — Erin M Piateski
*Assistant Examiner* — Paul Allen
(74) *Attorney, Agent, or Firm* — LEE, HONG, DEGERMAN, KANG & WAIMEY

(57) ABSTRACT

A display device linked to a vehicle which transmits a request for point of interest (POI) information based on sensing data of the vehicle to an augmented reality (AR) digital signage platform providing system; recognizes a spatial location of a building associated with POI information; transmits a rendering request for generating AR digital signage corresponding to the POI information on a floor-by-floor basis; receives a rendering result comprising the generated AR digital signage; displays a driving image acquired through a camera having the AR digital signage mapped to a display area in the driving image; and in response to the display area being changed in the driving
(Continued)

image, transmits, to the system, information related to the changed display area and receiving an updated rendering result for mapping the AR digital signage to the changed display area in the driving image.

14 Claims, 21 Drawing Sheets

(51) Int. Cl.

| | |
|---|---|
| ***B60K 35/21*** | (2024.01) |
| ***B60K 35/22*** | (2024.01) |
| ***B60K 35/23*** | (2024.01) |
| ***G01C 21/34*** | (2006.01) |
| ***G01C 21/36*** | (2006.01) |
| ***G06Q 30/0251*** | (2023.01) |
| ***G06T 11/00*** | (2026.01) |
| ***G06T 19/00*** | (2011.01) |
| ***G06V 20/20*** | (2022.01) |
| ***G06V 20/56*** | (2022.01) |
| *B60K 35/25* | (2024.01) |
| *B60K 35/26* | (2024.01) |
| *G06Q 50/40* | (2024.01) |

(52) U.S. Cl.
CPC .............. *B60K 35/23* (2024.01); *B60K 35/28* (2024.01); *G01C 21/3476* (2013.01); *G01C 21/3602* (2013.01); *G01C 21/3617* (2013.01); *G01C 21/3638* (2013.01); *G01C 21/3644* (2013.01); *G01C 21/3647* (2013.01); *G01C 21/365* (2013.01); *G01C 21/3679* (2013.01); *G01C 21/3697* (2013.01); *G06Q 30/0251* (2013.01); *G06T 11/00* (2013.01); *G06T 19/006* (2013.01); *G06V 20/20* (2022.01); *G06V 20/588* (2022.01); *B60K 35/211* (2024.01); *B60K 35/25* (2024.01); *B60K 35/26* (2024.01); *B60K 2360/177* (2024.01); *B60K 2360/21* (2024.01); *G06Q 50/40* (2024.01)

(58) Field of Classification Search
USPC .................................................. 701/400–541
See application file for complete search history.

(56) References Cited

U.S. PATENT DOCUMENTS 5,991,781 A 11/1999 Nielsen
10,573,057 B1 2/2020 Dixit et al.
10,823,578 B1 11/2020 England
2002/0138196 A1 9/2002 Polidi et al.
2005/0102102 A1 5/2005 Linn
2006/0129316 A1* 6/2006 Park .................. G01C 21/3679 701/431
2008/0243604 A1 10/2008 Pollard et al.
2009/0177383 A1* 7/2009 Tertoolen ........... G01C 21/3682 701/532
2010/0323609 A1 12/2010 Aramaki
2011/0072367 A1 3/2011 Bauer
2011/0093330 A1 4/2011 Burckart et al.
2011/0153198 A1 6/2011 Kokkas et al.
2011/0161875 A1 6/2011 Kankainen
2012/0016578 A1 1/2012 Coppens
2012/0059720 A1 3/2012 Musabji et al.
2012/0092369 A1 4/2012 Kim et al.
2012/0113138 A1 5/2012 Uusitalo et al.
2012/0197696 A1 8/2012 Beyeler et al.
2012/0310717 A1 12/2012 Kankainen
2012/0310741 A1 12/2012 Uyeki et al.
2013/0093787 A1 4/2013 Fulks et al.
2013/0158778 A1 6/2013 Tengler et al.
2013/0286254 A1* 10/2013 Watanabe .............. H04N 25/61 348/239
2013/0332066 A1 12/2013 Jeung et al.
2014/0063064 A1 3/2014 Seo et al.
2014/0087760 A1 3/2014 Bennett
2014/0114802 A1 4/2014 Mandalap
2015/0025971 A1 1/2015 Shipley et al.
2015/0112790 A1 4/2015 Wolinsky et al.
2015/0131761 A1 5/2015 Potter et al.
2015/0153191 A1* 6/2015 Ma ......................... G01C 21/20 701/410
2015/0193803 A1 7/2015 Zamer et al.
2015/0201439 A1 7/2015 Park et al.
2015/0296199 A1 10/2015 Fuehrer
2015/0310489 A1 10/2015 Hussain
2016/0003636 A1 1/2016 Ng-Thow-Hing et al.
2016/0004914 A1 1/2016 Park
2016/0086381 A1 3/2016 Jung et al.
2016/0121723 A1 5/2016 Fitch et al.
2016/0217623 A1 7/2016 Singh
2016/0357416 A1 12/2016 Abuduweili et al.
2017/0162177 A1 6/2017 Lebeck et al.
2017/0200048 A1* 7/2017 Yamada ............. G01C 21/3896
2017/0228760 A1 8/2017 Mason-Gugenheim et al.
2018/0018718 A1 1/2018 Childress et al.
2018/0033048 A1 2/2018 Le et al.
2018/0052594 A1 2/2018 Bemel-Benrud et al.
2018/0066956 A1 3/2018 Kim et al.
2018/0108079 A1 4/2018 Traub
2018/0130351 A1 5/2018 Ha et al.
2018/0137601 A1 5/2018 Takazawa
2018/0174336 A1 6/2018 Aghabeigi et al.
2018/0357898 A1 12/2018 Kamini et al.
2019/0017839 A1 1/2019 Eyler et al.
2019/0132284 A1 5/2019 Gould et al.
2019/0132406 A1 5/2019 Cai et al.
2019/0180485 A1* 6/2019 Kim ....................... G06V 20/20
2019/0182046 A1 6/2019 Rangaraj
2020/0134671 A1 4/2020 Maccini et al.
2020/0167826 A1 5/2020 Otsuka et al.
2020/0184219 A1* 6/2020 Mugura ............... H04N 9/3179
2020/0324787 A1 10/2020 Wang et al.
2020/0349770 A1 11/2020 Kuehne et al.
2021/0007459 A1 1/2021 Jeong et al.
2021/0190523 A1 6/2021 Stumpf et al.
2022/0012923 A1 1/2022 Lebeck et al.
2022/0116673 A1* 4/2022 Cho ................... G06Q 30/0265
2022/0207800 A1 6/2022 Pozdnyakov
2022/0229876 A1 7/2022 Carbune et al.
2022/0269920 A1 8/2022 Valencia et al.

FOREIGN PATENT DOCUMENTS

| | | |
|---|---|---|
| EP | 3499191 | 6/2019 |
| JP | 2017-126142 | 7/2017 |
| JP | 2018-142377 | 9/2018 |
| JP | 2019-164001 | 9/2019 |
| KR | 10-2013-0000160 | 1/2013 |
| KR | 10-1331827 | 11/2013 |
| KR | 10-2014-0143505 | 12/2014 |
| KR | 10-1817452 | 1/2018 |
| KR | 10-1848612 | 4/2018 |
| KR | 10-2019-0000860 | 1/2019 |
| KR | 10-2019-0058999 | 5/2019 |
| KR | 10-2019-0078676 | 7/2019 |
| KR | 10-2019-0104272 | 9/2019 |
| KR | 10-2103980 | 4/2020 |
| WO | 2008093983 | 8/2008 |

OTHER PUBLICATIONS

European Patent Office Application Serial No. 21919923.9, Search Report dated Mar. 5, 2024, 11 pages.
European Patent Office Application Serial No. 21919946.0, Search Report dated Jan. 11, 2024, 11 pages.
European Patent Office Application Serial No. 22739567.0, Search Report dated Mar. 6, 2024, 13 pages.

(56) References Cited

OTHER PUBLICATIONS

PCT International Application No. PCT/KR2022/000206, International Search Report dated Apr. 11, 2022, 2 pages.
PCT International Application No. PCT/KR2021/019615, International Search Report dated Apr. 11, 2022, 2 pages.
PCT International Application No. PCT/KR2022/000484, International Search Report dated Apr. 22, 2022, 3 pages.
PCT International Application No. PCT/KR2022/000483, International Search Report dated Apr. 13, 2022, 3 pages.
PCT International Application No. PCT/KR2021/020065, International Search Report dated Apr. 11, 2022, 2 pages.
PCT International Application No. PCT/KR2022/000561, International Search Report dated Apr. 22, 2022, 2 pages.
PCT International Application No. PCT/KR2022/000442, International Search Report dated Apr. 20, 2022, 3 pages.
European Patent Office Application Serial No. 22739632.2, Search Report dated Mar. 28, 2025, 15 pages.
European Patent Office Application Serial No. 22739631.4, Search Report dated Mar. 31, 2025, 14 pages.
U.S. Appl. No. 18/271,843, Office Action dated Oct. 24, 2025, 7 pages.
U.S. Appl. No. 18/272,012, Final Office Action dated Nov. 19, 2025, 12 pages.
U.S. Appl. No. 18/272,052, Notice of Allowance dated Nov. 25, 2025, 6 pages.
U.S. Appl. No. 18/025,462, Office Action dated Dec. 1, 2025, 35 pages.
U.S. Appl. No. 18/272,012, Office Action dated Mar. 25, 2026, 14 pages.
U.S. Appl. No. 18/271,843, Final Office Action dated Apr. 1, 2026, 18 pages.
U.S. Appl. No. 18/025,462, Final Office Action dated May 12, 2026, 39 pages.

* cited by examiner

1100

DISPLAY DEVICE LINKED TO VEHICLE AND OPERATING METHOD THEREOF

CROSS-REFERENCE TO RELATED APPLICATIONS

This application is the National Stage filing under 35 U.S.C. 371 of International Application No. PCT/KR2021/020065, filed on Dec. 28, 2021, which claims the benefit of earlier filing date and right of priority to Korean Application No. 10-2021-0004116, filed on Jan. 12, 2021, the contents of which are all hereby incorporated by reference herein in their entirety.

TECHNICAL FIELD

The present invention relates to a display device linked to a vehicle and an operating method thereof, and more particularly, to a display device linked to a vehicle and configured to communicate with a system to display augmented reality (AR) digital signage on a floor-by-floor basis in a building in a driving image of a vehicle floor and an operating method thereof.

BACKGROUND ART

For safety and convenience of a user who uses a vehicle, various sensors and devices are disposed at the vehicle, and functions of the vehicle are diversified. The functions of the vehicle may be divided into convenience functions for promoting the driver's convenience, and safety functions for enhancing safety of the driver, passenger, and/or pedestrians.

The convenience function of the vehicle has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function of the vehicle is a technique of ensuring safety of the driver, passenger, and/or pedestrians, and may include various functions, such as a lane departure warning system (LDWS), a lane keeping assist system (LKAS), an autonomous emergency braking (AEB), and the like.

Recently, a technology for augmented reality (AR) that outputs a graphic object through a vehicle's windshield or head-up display (HUD) or that outputs a graphic object to an image captured by a camera to additionally output the graphic object to the real world is being actively developed. In particular, by utilizing such AR technology, the development of technologies for guiding a route to a driver through AR technology or for exposing various additional information or advertisements related to points of interest (POI) existing on a route is expanding.

Meanwhile, various guidance or advertisements through AR technology are expressed in the form of AR objects over an actual driving image. Thus, with existing technology there is a sense of separation from reality, along with limitations in providing a variety of information at once.

Also, there is a limitation in that when various announcements or advertisements through augmented reality (AR) technology are displayed on a driving image as described above, a building's shape based on a driver's viewing angle, a vehicle driving situation, a driver's individual tendency, and nearby traffic and structural environments cannot be flexibly reflected.

Furthermore, there is another limitation in that once an announcement or advertisement using AR technology is displayed at a predetermined position (e.g., overlapping with or adjacent to an associated object), the display position cannot be varied according to the environment changing due to vehicle driving. Accordingly, there is a problem in that the visibility of an announcement or advertisement using AR technology is reduced.

SUMMARY OF THE DISCLOSURE

The present invention aims to solve the above and other problems.

According to some embodiments of the present invention, an object of the present invention is to provide a vehicle display device capable of providing AR digital signage closely similar to a real signboard on a driving image of a vehicle and an operating method thereof.

Also, according to some embodiments of the present invention, an object of the present invention is to provide a vehicle display device capable of providing not one piece of but a plurality of pieces of AR digital signage at positions corresponding to a plurality of points of interest (POIs) on a floor-by-floor basis in a building including the POIs and an operating method thereof.

Also, according to some embodiments of the present invention, an object of the present invention is to provide a vehicle display device capable of naturally and variably providing images of a plurality of pieces of AR digital signage by flexibly reflecting a building's shape based on a driver's viewing angle, a vehicle driving situation, a driver's personal tendency, and nearby traffic and structural environments.

Also, according to some embodiments of the present invention, an object of the present invention is to provide a vehicle display device capable of changing an information type and a display position according to the environment changing due to vehicle driving or nearby obstacles even after a plurality of pieces of AR digital signage are displayed on a floor-by-floor basis in a building including a plurality of POIs and an operating method thereof.

To this end, a display device linked to a vehicle according to the present invention is a vehicle-linked display device and may communicate with a vehicle that provides sensing data of the vehicle and a digital signage platform providing system that collects, processes, merges, and renders data to generate augmented reality (AR) digital signage floor on a floor-by-floor basis in a building.

Also, the display device according to the present invention may send, to the system, a rendering request for receiving AR digital signage corresponding to content information related to a plurality of pieces of POI information included in a building area on a floor-by-floor basis using the sensing data of the vehicle, a spatial location of the building area, and floor number information.

Also, the display device according to the present invention may receive a result of the rendering request and map and display an image of the AR digital signage in a display area determined based on an image of the building area in a driving image on a floor-by-floor basis. In this case, the display device may determine the display device differently depending on the shape of the image of a building determined based on the sensing data of the vehicle, for example, camera sensing data and may map and display the AR digital signage on a floor-by-floor basis according to a varied display area.

A display device linked to a vehicle according to an embodiment of the present invention may include a communication unit configured to communicate with a digital signage platform providing system; a display configured to display a driving image of the vehicle acquired through a camera; and a control unit configured to receive sensing data of the vehicle and transmit to the system, via the communication unit, a request for point of interest (POI) information based on the sensing data, wherein the control unit is further configured to: recognize a spatial location of a building associated with a plurality of POI information; transmit a rendering request for generating augmented reality (AR) digital signage corresponding to the plurality of POI information on a floor-by-floor basis; receive a rendering result comprising the generated AR digital signage, wherein the AR digital signage is generated based on the sensing data of the vehicle, the spatial location of the building, and floor number information of the plurality of POI information; cause the display to display the driving image having the AR digital signage mapped to a display area in the driving image; and in response to the display area being changed in the driving image, transmit information to the system related to the changed display area and receive an updated rendering result for mapping the AR digital signage to the changed display area in the driving image.

In an embodiment, the transmitted information related to the changed display area relates to a distortion ratio of the image of the building in the driving image.

In an embodiment, based on at least a portion of the building in the driving image not being recognized or being out of the field of view of the camera, the AR digital signage is displayed to be mapped to another object or structure in the driving image.

In an embodiment, the display area is changed based on the sensing data of the vehicle while the vehicle is being driven.

In an embodiment, the display area is changed based on changes to respective areas of a front side and a lateral side of the building in the driving image while the vehicle is being driven, and wherein the display area is changed from one side of the building to another side of the building in the driving image.

In an embodiment, the AR digital signage is displayed to gradually move from one side of the building to another side of the building in the driving image according to a driving direction and driving speed of the vehicle.

In an embodiment, an amount of content information included in the AR digital signage is based on a driving speed of the vehicle.

In an embodiment, an amount of content information included in the AR digital signage is varied based on a determination that the vehicle is approaching the building based on the driving image.

In an embodiment, one of the plurality of POI information includes pre-registered preference POI information provided to the system, and the control unit is further configured to: display AR digital signage corresponding to the pre-registered preference POI information on an entire side of the building as the display area in the driving image; and display AR digital signage of a plurality of non-pre-registered preference POI information on a floor by floor basis on another side of the building in the driving image.

In an embodiment, the control unit may transmit information on a destination of the vehicle to the system, and display AR digital signage corresponding to the destination to be visually distinct from other AR digital signage in the driving image.

In an embodiment, only AR digital signage for a floor number corresponding to the destination is displayed in the driving image as the vehicle approaches the building.

An operating method of a display device linked to a vehicle according to an embodiment of the present invention may include the following operations, each of which may be performed by a process embedded in the display device. Specifically, the method, which is performed by the processor, may include operations of: transmitting a request for point of interest (POI) information based on sensing data of the vehicle to an augmented reality (AR) digital signage platform providing system; recognizing a spatial location of a building associated with a plurality of POI information; transmitting, to the system, a rendering request for generating AR digital signage corresponding to the plurality of POI information on a floor-by-floor basis; receiving a rendering result comprising the generated AR digital signage, wherein the AR digital signage is generated based on the sensing data of the vehicle, the spatial location of the building, and floor number information of the plurality of POI information; displaying a driving image acquired through a camera having the AR digital signage mapped to a display area in the driving image; and in response to the display area being changed in the driving image, transmitting, to the system, information related to the changed display area and receiving an updated rendering result for mapping the AR digital signage to the changed display area in the driving image.

In an embodiment, the transmitted information related to the changed display area relates to a distortion ratio of the image of the building in the driving image.

In an embodiment, based on at least a portion of the building in the driving image not being recognized or being out of the field of view of the camera, the AR digital signage is displayed to be mapped to another object or structure in the driving image.

In an embodiment, the display area is changed based on the sensing data of the vehicle obtained while the vehicle is being driven.

According to some embodiments of the present invention, by mapping augmented reality (AR) signage to a building in a driving image and displaying the AR signage to be closely similar to a real signboard, it is possible to solve the awkwardness caused by artificially displaying an AR object on a driving route screen in a conventional manner.

According to some embodiments of the present invention, it is possible to solve the conventional limitation of displaying only one advertisement in one area even if augmented reality (AR) technology is used, and thus advantageously, it is possible to provide extensibility for providing a plurality of various advertisements to one building.

According to some embodiments of the present invention, even after the AR digital signage is mapped to the display area of the building on a floor-by-floor basis, it is possible to flexibly reflect the shape of a building based on a driver's view, a driving situation of a vehicle, preference, and nearby traffic and structural environments to vary the location of the display area. Accordingly, it is possible to enhance the visibility of the displayed AR digital signage.

According to some embodiments of the present invention, by varying the amount of or the display method for information provided through AR digital signage based on service levels, user preferences, and environmental changes due to vehicle driving, it is possible to more effectively display advertisement information. For example, by providing a more detailed and active advertisement as a vehicle approaches a building on which AR digital signage is displayed and then is driven at a low speed or stops for a while, it is possible to maximize an advertising effect.

DETAILED DISCLOSURE

Figure 1:
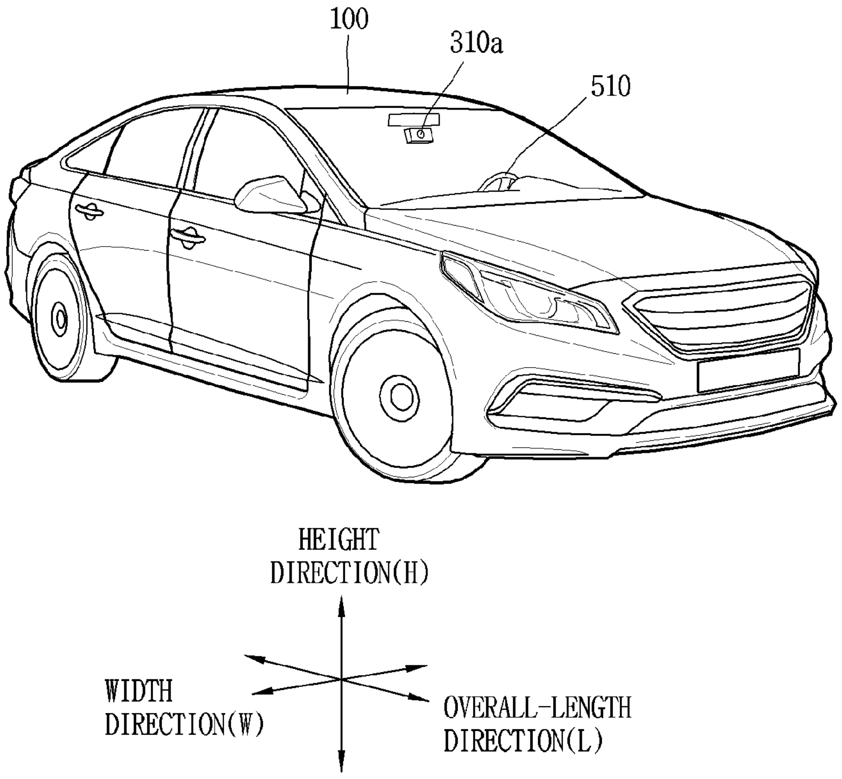
FIG. 1 is a diagram illustrating an exemplary vehicle according to an implementation.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

In the present disclosure, "system" may include at least one of a server apparatus and a cloud apparatus, but is not limited thereto. For example, the system may be composed of one or more server apparatuses. As another example, the system may be composed of one or more server apparatuses. As still another example, the system may be operated by configuring a server apparatus and a cloud apparatus.

In the present disclosure, a "user terminal" or "user client" may be referred to as including a computing device and/or system or a user of a user terminal capable of communicating with a vehicle (or a vehicular electronic device, apparatus, or system provided in a vehicle) and an AR digital signage platform providing apparatus or system.

In the present disclosure, a "digital signage platform" may provide an embedded, an apparatus-based, or a cloud-based platform capable of Platform as a Service (PaaS) and/or Machine Learning as a Service (MLaaS). This digital signage platform is related to a method or operation of providing AR digital signage.

In the present disclosure, "map information" may be referred to as including images captured by a vision sensor such as a camera, two-dimensional (2D) map information, three-dimensional (3D) map information, a digital-twin 3D map, and map information in real/virtual space.

In the present disclosure, "point of interest (POI) information" indicates a point of interest selected based on the map information and may include pre-registered POI information (POIs stored in a map of a cloud server), user-set POI information (e.g., home, school, company, etc.), driving-related POI information (e.g., destination, stopover, gas station, rest area, parking lot, etc.). Such POI information may be updated based on the current location of the vehicle in real time.

In the present disclosure, "driving image" is obtained through a vision sensor of or near a vehicle and, for example, may include an image acquired or projected through a vision sensor (a camera, a laser sensor for images, etc.) during the driving of the vehicle and a real image or a virtual space image projected onto the vehicle's windshield or other display surface. That is, the driving image may be referred to as including an image output through a display, an image projected through a laser sensor, or a real image seen through a vehicle windshield.

Figure 2:
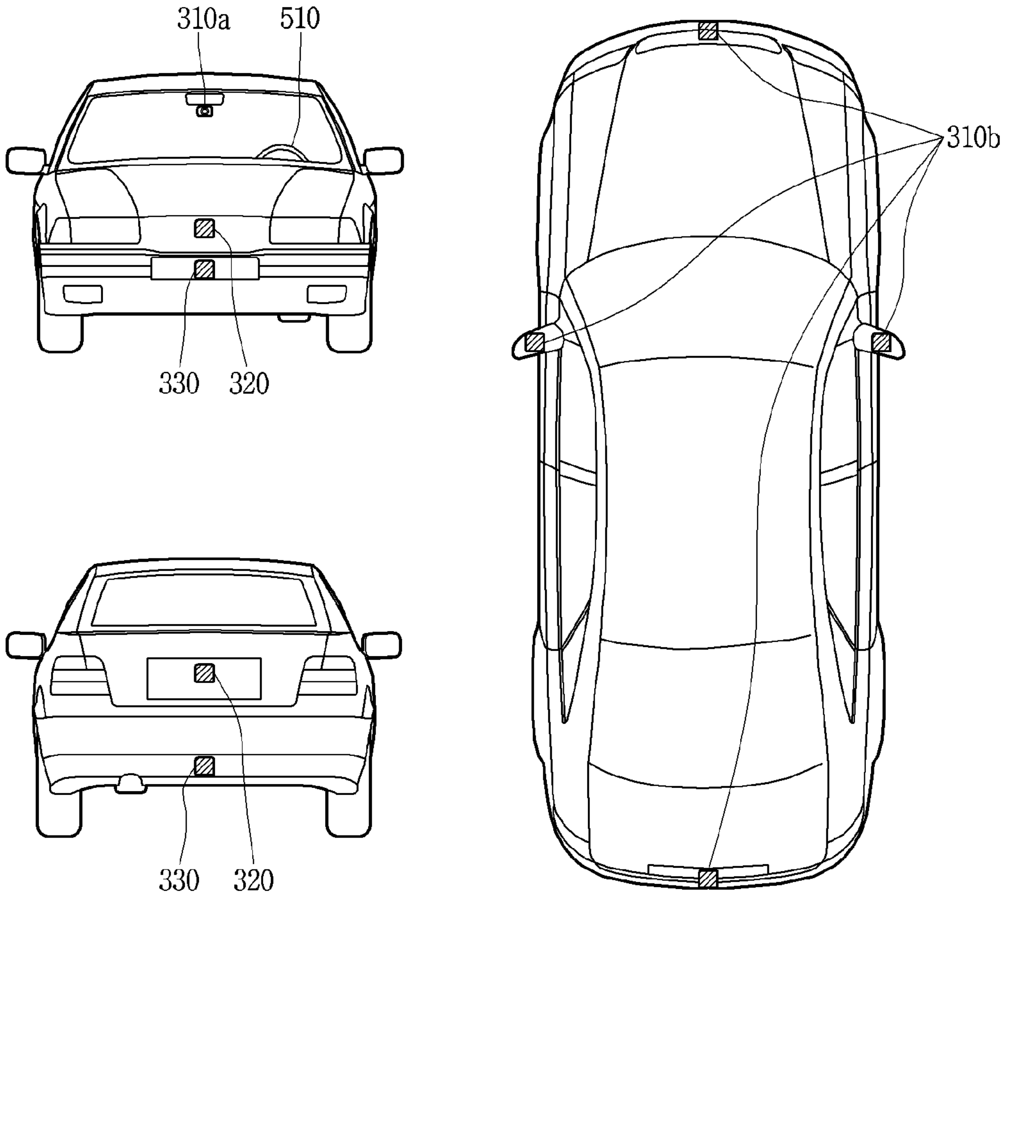
FIG. 2 is a diagram illustrating the vehicle according to the implementation at various angles.
Figure 3:
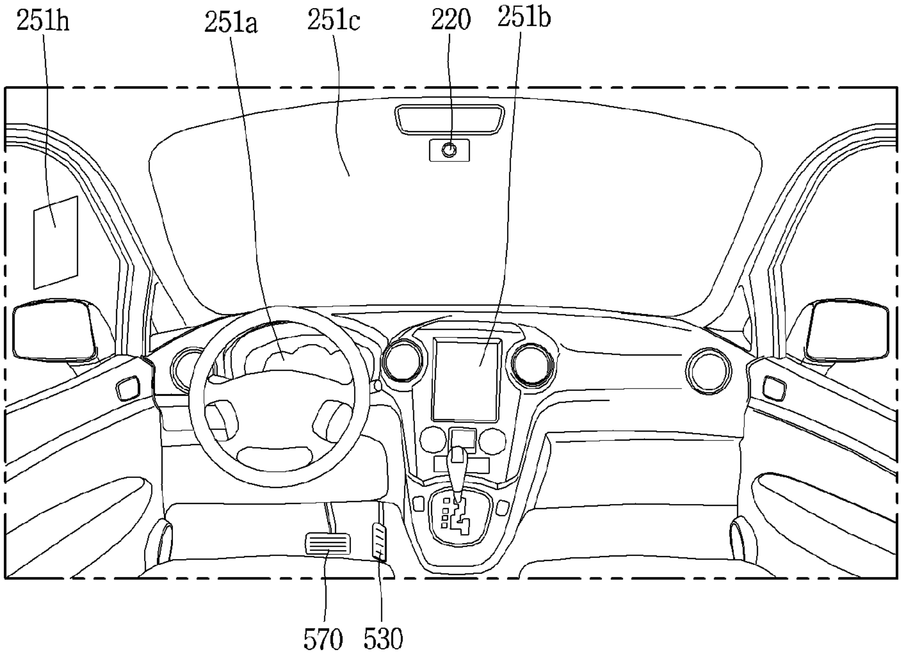
FIGS. 3 and 4 are diagrams illustrating the interior of the vehicle.
Figure 4:
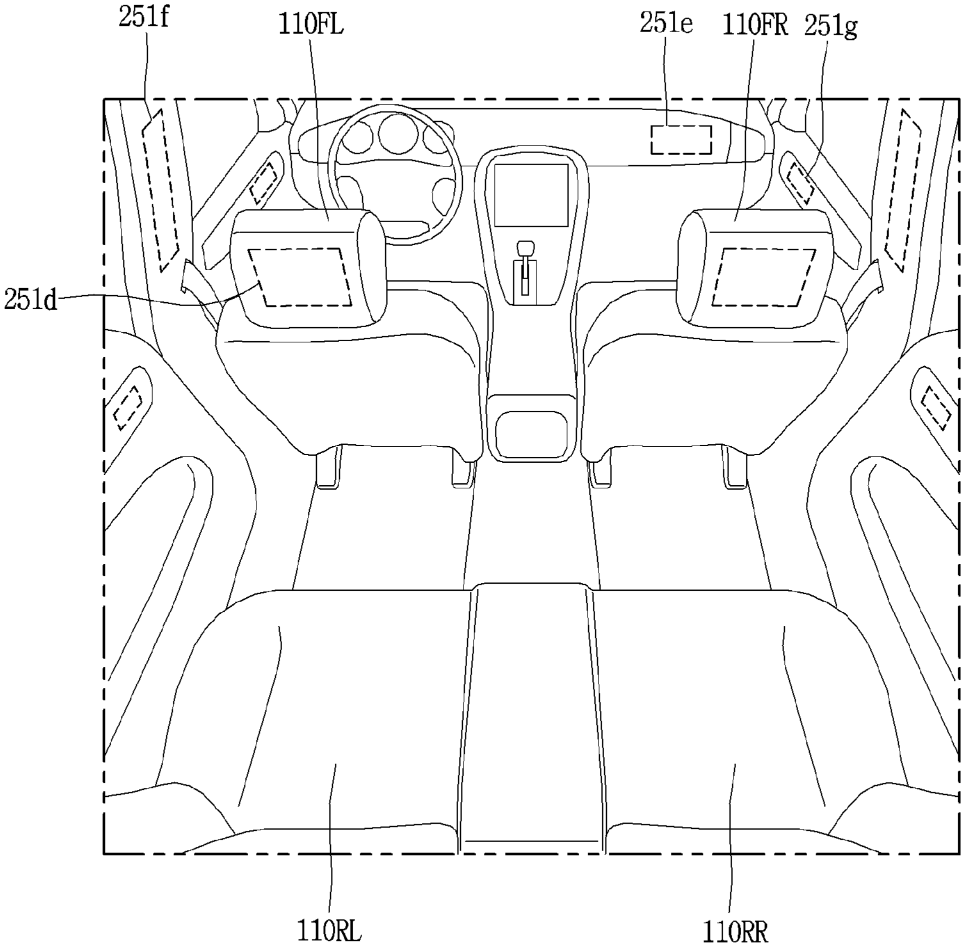

FIGS. 1 and 2 illustrate the exterior of a vehicle according to an implementation and FIGS. 3 and 4 illustrate the interior of the vehicle.

Figure 5:
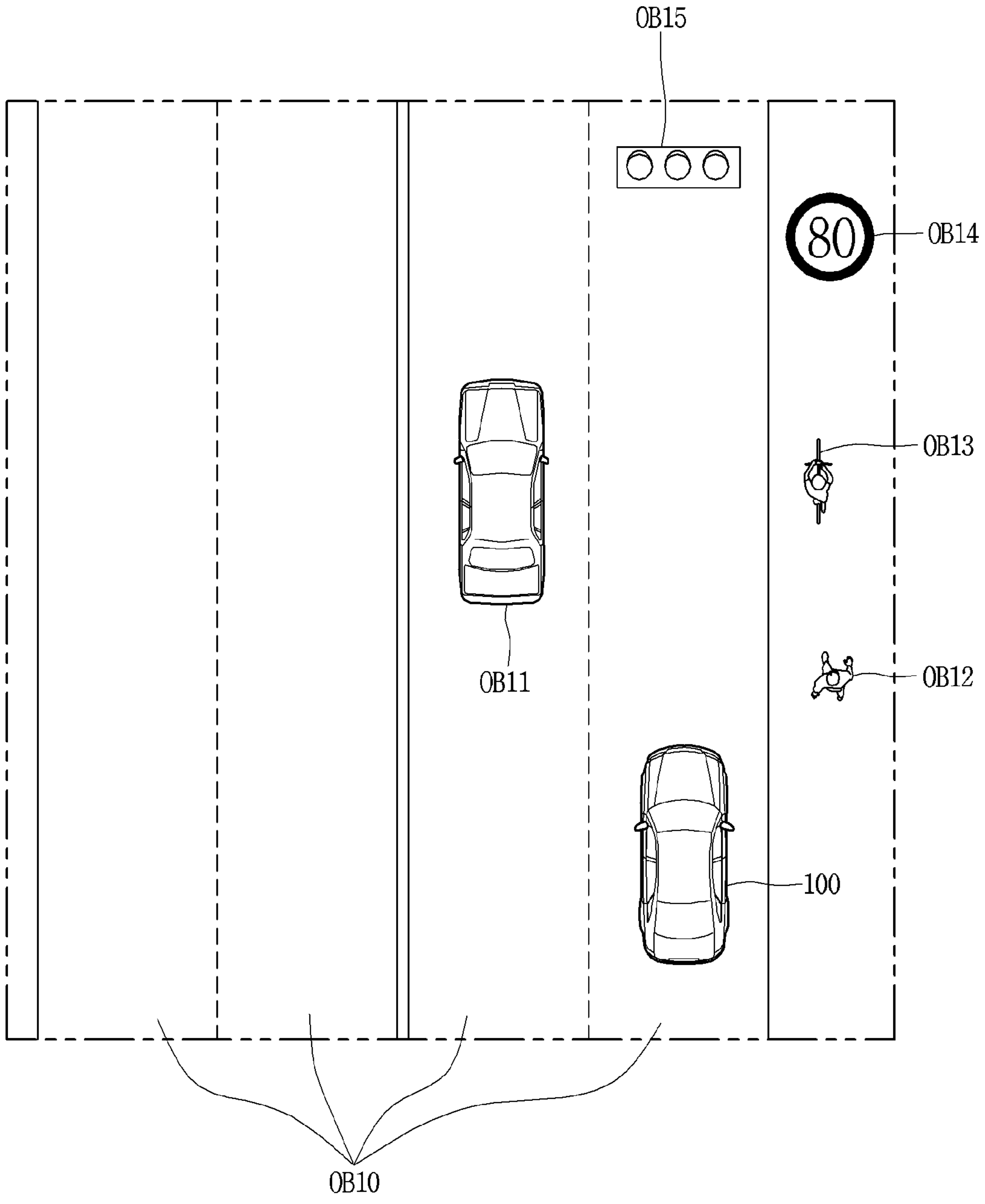
FIGS. 5 and 6 are diagrams illustrating various objects related to driving (traveling) of the vehicle.
Figure 6:
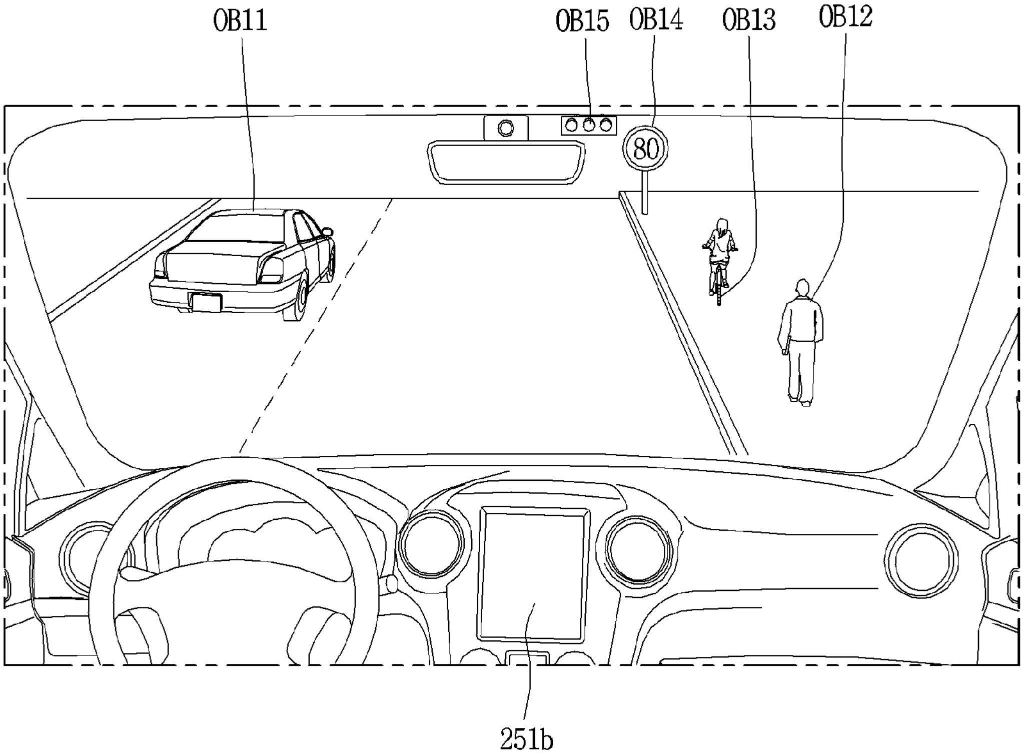

FIGS. 5 and 6 are diagrams illustrating various objects related to driving (traveling) of the vehicle.

Figure 7:
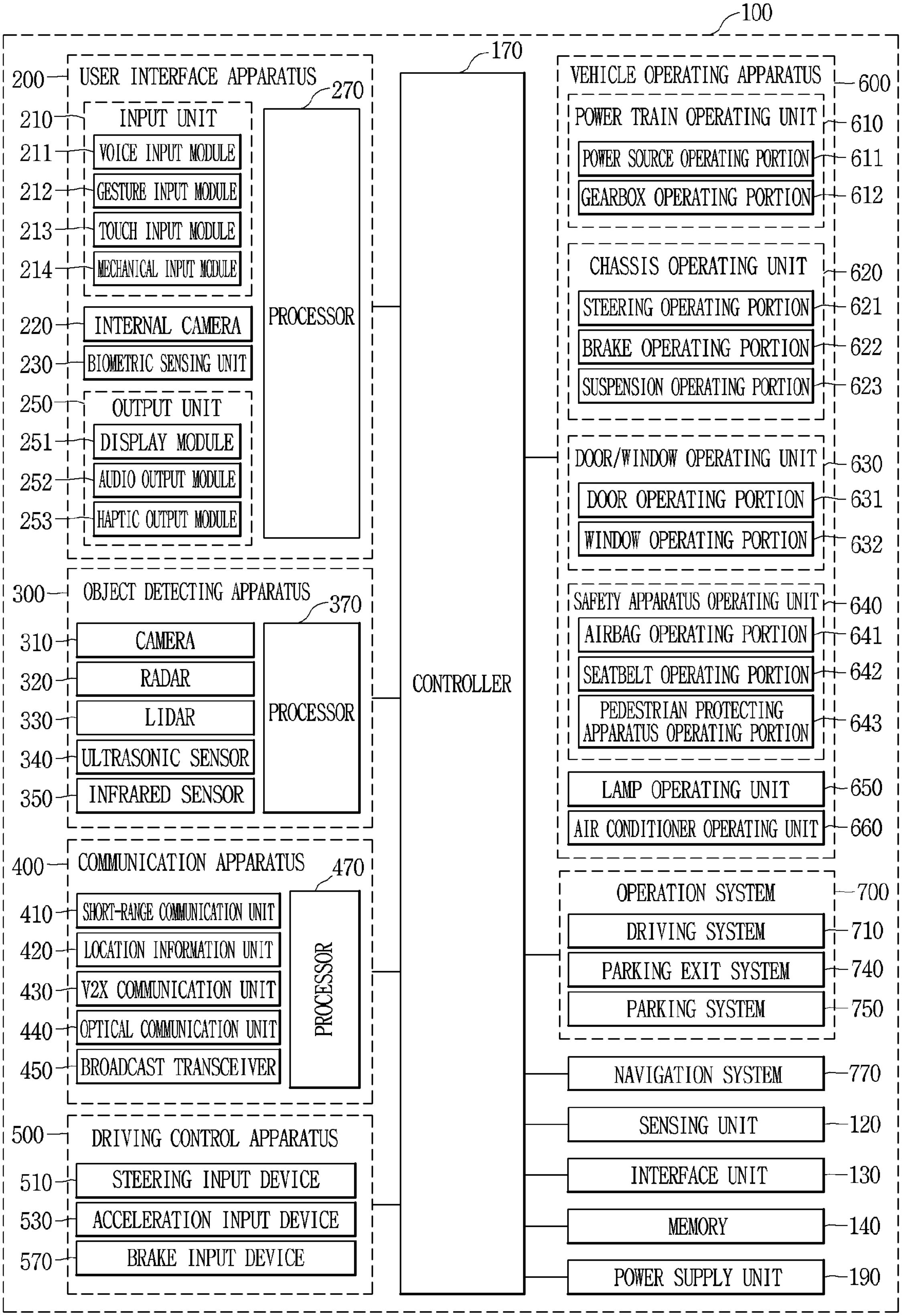
FIG. 7 is a block diagram illustrating the vehicle in accordance with the implementation.

FIG. 7 is a block diagram illustrating the vehicle in accordance with the implementation. FIG. 7 is a block diagram illustrating the vehicle according to the implementation.

As illustrated in FIGS. 1 to 7, a vehicle 100 may include wheels turning by a driving force, and a steering input device 510 for adjusting a driving (traveling, ongoing, moving) direction of the vehicle 100.

The vehicle 100 may be an autonomous vehicle. The vehicle 100 may be switched into an autonomous mode or a manual mode based on a user input. For example, the vehicle may be switched from the manual mode into the autonomous mode or from the autonomous mode into the manual mode based on a user input received through a user interface apparatus (hereinafter, referred to as 'user terminal') 200.

The vehicle 100 may be switched into the autonomous mode or the manual mode based on driving environment information. The driving environment information may be generated based on object information provided from an object detecting apparatus 300. For example, the vehicle 100 may be switched from the manual mode into the autonomous mode or from the autonomous module into the manual mode based on driving environment information generated in the object detecting apparatus 300. In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700. For example, the autonomous vehicle 100 may be driven based on information, data or signals generated in a driving system 710, a parking exit system 740, or a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a distance from a bottom of a wheel to a roof of the vehicle. In the following description, an overall-length direction L may refer to a direction corresponding to the overall length of the vehicle 100, a width direction W may refer to a direction corresponding to a width of the vehicle 100, and a height direction H may refer to a direction corresponding to a height of the vehicle 100

As illustrated in FIG. 7, the vehicle 100 may include a user interface apparatus (hereinafter, referred to as 'user terminal') 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus (hereinafter, also referred to as 'user terminal') 200.

The user interface apparatus 200 may include an input unit 210, an internal camera 220, a biometric sensing unit 230, an output unit 250 and at least one processor, such as processor 270. In some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of a pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170. The voice input module 211 may include at least one microphone.

The gesture input module 212 may convert a user's gesture input into an electric signal. The converted electric signal may be provided to the processor 270 of the user interface apparatus 200 or the controller 170.

The gesture input module 212 may include at least one of an infrared sensor and an image sensor for detecting the user's gesture input. According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method, or a disparity method.

The touch input module 213 may convert the user's touch input into an electric signal. The converted electric signal may be provided to the processor 270 of the user interface apparatus 200 or the controller 170.

The touch input module 213 may include a touch sensor for detecting the user's touch input. According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, or a jog switch. An electric signal generated by the mechanical input module 214 may be provided to the processor 270 or the controller 170. The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display module 251, an audio output module 252, or a haptic output module 253.

The display module 251 may output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display, or an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window. The transparent display may have a predetermined degree of transparency and output a predetermined screen thereon. The transparent display may include at least one of a thin film electroluminescent (TFEL), a transparent OLED, a transparent LCD, a transmissive transparent display, or a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 251*a*, 251*b*, 251*e* of an instrument panel, one area 251*d* of a seat, one area 251*f* of a pillar, one area 251*g* of a door, one area of a center console, one area of a headlining or one area of a sun visor, or implemented on one area 251*c* of a windshield or one area 251*h* of a window.

The audio output module 252 may convert an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor (hereinafter, also referred to as 'controller') 270 of the user interface apparatus 200 may control an overall operation of each unit of the user interface apparatus 200. In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be referred to as a display apparatus for the vehicle. The user interface apparatus 200 may operate according to the control of the controller 170.

The object detecting apparatus 300 is an apparatus for detecting an object located outside of the vehicle 100. The object may be a variety of objects associated with driving (operation) of the vehicle 100. Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle is traveling in an opposite direction to the vehicle 100. The lanes OB10 may include left and right lines defining a lane.

The another vehicle OB11 may be a vehicle which traveling in the vicinity of the vehicle 100. The another vehicle OB11 may be a vehicle located within a predetermined distance from the vehicle 100. For example, the another vehicle OB11 may be a vehicle traveling ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle that is located in the vicinity of the vehicle 100 and operating using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope, and the like.

The structure may be an object that is located near a road and fixed on the ground. For example, the structure may include a streetlamp, a roadside tree, a building, an electric pole, a traffic light, a bridge and the like.

The terrain may include a mountain, a hill, and the like.

Meanwhile, objects may be classified into a moving object and a fixed object. For example, the moving object may be a concept including another vehicle and a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350, and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear, or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform communication by including at least one of a transmitting antenna, a receiving antenna, and radio frequency (RF) circuit, or RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving direction of the vehicle 100 from the user. The steering input device 510 may be configured in the form of a wheel allowing a steering input in a rotating manner. In some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled.

The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 may change the state of the gearbox into drive (forward) (D), reverse (R), neutral (N) or parking (P).

In some examples, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be securely seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

In some examples, the operation system 700 may include at least one processor. Each unit of the operation system 700 may individually include a processor.

In some implementations, the operation system may be implemented by the controller 170 when it is implemented in a software configuration.

In some implementations, the operation system 700 may be implemented by at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot. The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100. The parking system 750 may receive object information from the object detecting apparatus 300, transmit a control signal to the vehicle operating apparatus 600 and park the vehicle 100. The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, or current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the digital signage platform providing apparatus according to the present invention may communicate with a user interface device (or hereinafter referred to as "user terminal") 200 or a navigation system 770 of a vehicle 100 to provide a platform and/or related data for providing AR digital signage to a building in a driving image on a floor-by-floor basis.

In the present disclosure, AR digital signage refers to providing multimedia information displayed on a building or related area in a driving image using augmented reality (AR) technology and is obtained by implementing a function such as an outdoor signboard with AR technology.

As disclosed herein, the displaying of AR digital signage in a building in which a plurality of pieces of POI information are present on a floor-by-floor basis refers to determining floor number information matched to the POI information and displaying content information corresponding to each floor of the building on a floor-by-floor basis using AR digital signage when content information (e.g., advertisement information, brand information, news information, etc.) related to the plurality of pieces of POI information is present.

Figure 8:
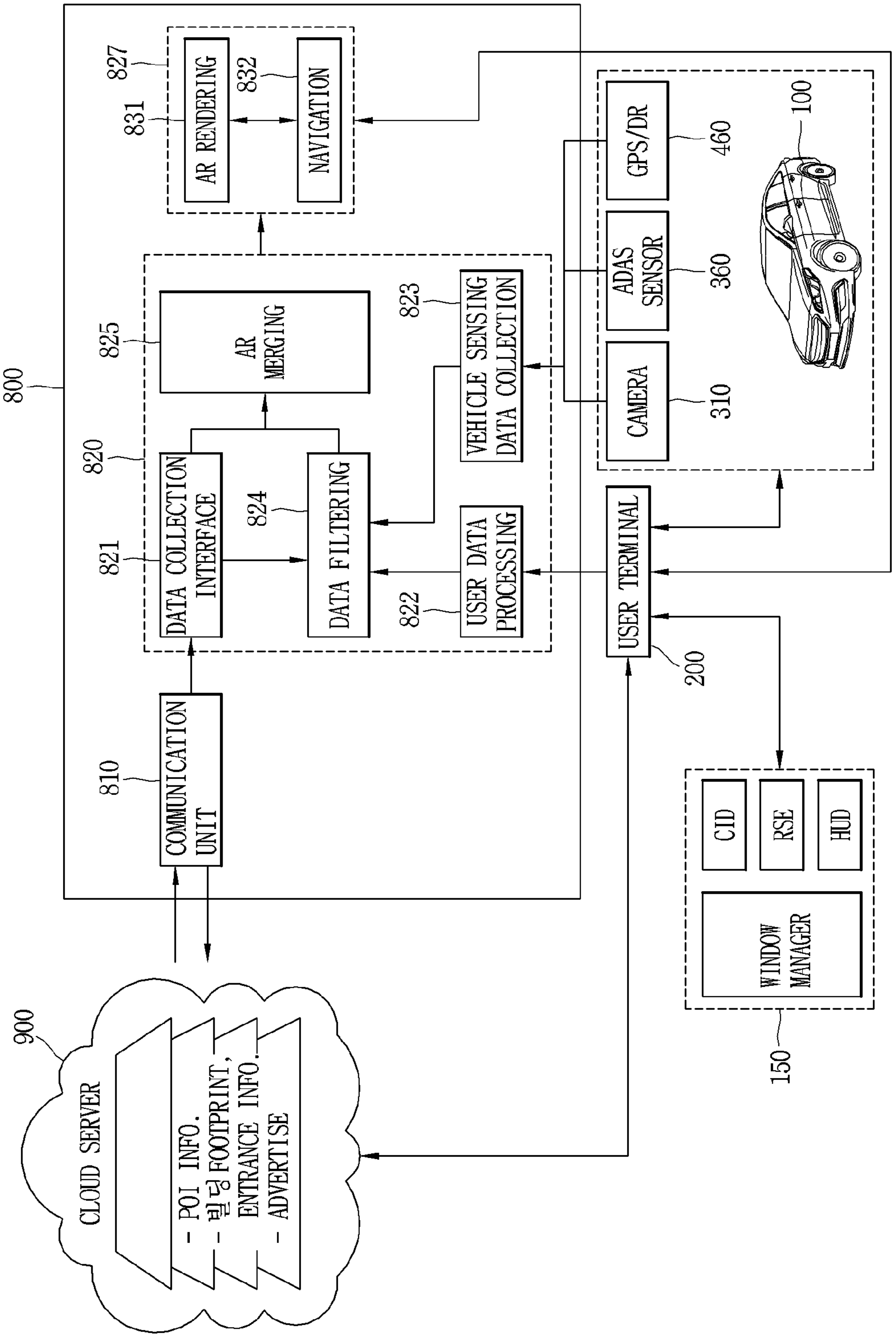
FIG. 8 is a block diagram showing communication with a digital signage platform providing apparatus, a user terminal, and a cloud server according to an embodiment of the present invention.

FIG. 8 is a block diagram showing that a digital signage platform providing apparatus 800 is communicatively connected to a user terminal 200, a vehicle 100, and a cloud server 900.

The digital signage platform providing apparatus 800 according to the present invention may be implemented as a portion of a vehicular electronic device or system of the vehicle 100 or may be included in the cloud server. Also, the digital signage platform providing apparatus 800 may be implemented in the form of a program implemented by a processor of the user terminal 200 linked with the vehicle 100.

The digital signage platform providing apparatus 800 may communicate with the vehicle 100 to collect sensing data through a sensor provided in the vehicle 100 and may collect and process user data through the user terminal 200 linked with the vehicle 100. The digital signage platform providing apparatus 800 may filter and process data collected in communication with the vehicle 100 and the user terminal 200 and information collected through the cloud server 900, perform AR merging, and make a rendering request to generate AR digital signage.

The digital signage platform providing apparatus 800 may transmit a result for the rendering request to the user terminal 200 and may request continuous image correction for performing mapping into a driving image displayed on a windshield, a dashboard, a head-up display (HUD), etc. through the user terminal 200. Here, the user terminal 200 may be implemented as a user interface device or a navigation system 770 implemented as a part of the system of the vehicle 100 as described above.

The digital signage platform providing apparatus 800 is communicatively connected to the cloud server 900 through the communication module 810. A plurality of cloud servers 900 may communicate with the digital signage platform providing apparatus 800.

The digital signage platform providing apparatus 800 may communicate with the cloud server 900 to receive map information such as 2D or 3D map information, building footprint information, entrance information, and floor number information including POI information.

Also, the digital signage platform providing apparatus 800 may communicate with the cloud server 900 to receive advertisement information about a POI (e.g., advertisement information collected in operative association with databases such as NoSQL DB, Mongo, etc.) Also, the digital signage platform providing apparatus 800 may communicate with the cloud server 900 to receive real-time traffic information.

The digital signage platform providing apparatus 800 may collect and store the map information, advertisement information, and traffic information received from the cloud server 900 in a data collection interface 821. The collected and stored information is delivered for data filtering (824).

Also, the digital signage platform providing apparatus 800 receives vehicle sensing data from a camera 310, an advanced driver assistance systems (ADAS) sensor 360, and a global positioning system (GPS)/dead reckoning (DR) unit 460 provided in the vehicle 100 through a communication unit (not shown) or a user interface (not shown). Here, the vehicle sensing data may include, for example, a driving image acquired through the camera 310 provided in the vehicle, a driving direction and speed, a distance from a lane, and the like acquired through the ADAS sensor 360, and location data of the vehicle acquired through a vehicle navigation system such as the GPS/DR unit 460. The received vehicle sensing data is collected and stored through vehicle sensing data collection (823), and the stored information is delivered for the data filtering (824).

Also, the digital signage platform providing apparatus 800 may receive a request corresponding to a user input (e.g., a request for AR signage provision, a request for route guidance, etc.) from the user terminal 200 that is embedded in or linked with the vehicle 100. The received user input is processed through user data processing (822) and delivered for data filtering (824).

In the data filtering (824) of the digital signage platform providing apparatus 800, information received from the cloud server 900, input information transmitted by the user terminal 200, and vehicle sensing data received from the vehicle 100 are filtered and processed so that only optimal data to be shown in a driving image remains.

Specifically, the digital signage platform providing apparatus 800 detects a building area including a plurality of pieces of POI information, calculates spatial coordinates of the building area, and acquires floor number information for each of the plurality of pieces of POI information on the basis of the map information received from the cloud server 900. Then, the digital signage platform providing apparatus 800 may calculate the reference point of the building area for displaying content information related to the plurality of pieces of POI information on the basis of the sensing data of the vehicle obtained by the vehicle sensing data collection (823) and the spatial coordinates and the floor number information of the building area.

The calculation of the reference point is a process for providing a realistic sense as if a signage signboard is displayed on an actual building by matching the viewpoint of an actual driving road view or the above-mentioned driving image to the viewpoint of a screen in which the content information related to the plurality of pieces of POI information is to be rendered.

Next, the digital signage platform providing apparatus 800 performs a rendering request for displaying AR digital signage corresponding to the content information related to the plurality of pieces of POI information in a display area determined based on the calculated reference point.

To this end, the information or data filtered and processed by the data filtering (824) is AR-merged with map information collected through the cloud server 900 continuously and in real time (825). The digital signage platform providing apparatus 800 provides the AR-merged (825) information or data to an AR engine to request AR rendering.

The AR engine 830 may be embedded in the digital signage platform providing apparatus 800 as shown in FIG. 8. Alternatively, in other embodiments, the AR engine 830 may be implemented by the user terminal 200, the user interface device 200 (see FIG. 7) of the vehicle shown in FIG. 7, or a processor included in the navigation system 770 or may be implemented by a separate terminal, apparatus, or cloud server.

In response to the AR rendering request, the AR engine 830 may perform AR rendering (831) on a route of navigation (832) (or 2D or 3D map information) on the basis of the AR-merged (825) information or data in real time. Thus, the actual driving road view and the viewpoint of the screen in which the AR digital signage is to be rendered are matched with each other.

The result of rendering through the AR engine 830 may be transmitted to the user terminal 200. Based on the rendering result, the user terminal 200 may map the AR digital signage to corresponding floors of a building in the driving image displayed on the display of the user terminal 200 or a display device of the vehicle 100, for example, a center information display (CID), a cluster, a head-up display (HUD), a rear mirror display, a rear-seat entertainment (RSE) system, a vehicle windshield/dashboard, or the like and output the mapped AR digital signage on a floor-by-floor basis.

In this case, a driving image captured or reflected through a camera sensor provided in the vehicle 100 is output to the display of the user terminal 200 or a display or LCD screen provided in the CID, HUD, or RSE of the vehicle 100, and AR digital signage is mapped to the corresponding driving image. On the other hand, a vehicle display device such as an AR navigation system maps AR digital signage to the vehicle windshield or dashboard by direct projection through a laser sensor or the like provided in the vehicle 100.

Therefore, in the present disclosure, a "driving image" includes an image captured through a camera sensor (or smart glasses including such a function), an image reflected on the LCD screen through a camera sensor, an actual space image displayed on a windshield or dashboard into which AR digital signage is directed projected, digitally-twinned 3D image, and the like.

Meanwhile, the user terminal 200 may transmit the mapping result to the digital signage platform providing apparatus 800 such that the display area in which the image of the AR digital signage is mapped and the display area of the building in the driving image or the actual driving road view are matched with each other and may receive an image correction request from the digital signage platform providing apparatus 800 continuously and in real time.

Figure 9:
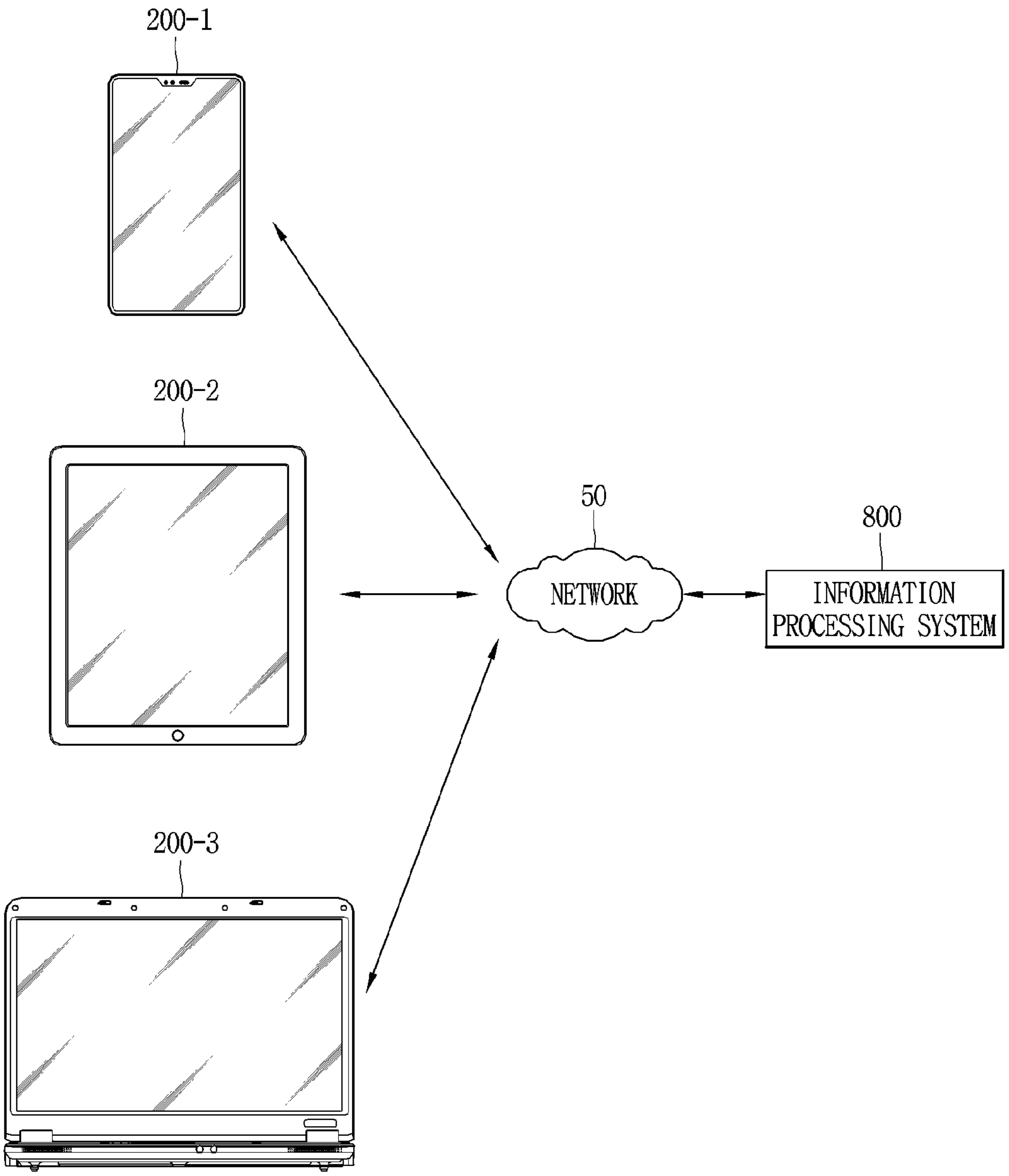
FIG. 9 is a block diagram showing that an information processing system related to an embodiment of the present invention communicates with a plurality of user terminals.

FIG. 9 is a block diagram showing that an information processing system related to an embodiment of the present invention is communicatively connected to a plurality of user terminals.

FIG. 9 is a schematic diagram illustrating a configuration in which an information processing system 800 according to an embodiment of the present disclosure is communicatively connected to a plurality of user terminals 200_1, 200_2, and 200_3. Here, the information processing system 800 may refer to a system capable of providing a digital signage platform according to the present invention. Also, the plurality of user terminals 200_1, 200_2, and 200_3 may be referred to as a device, such as a user terminal embedded in, provided in, or connected to the vehicle 100.

As shown, the plurality of user terminals 200_1, 200_2, and 200_3 may be connected to an information processing system capable of providing an AR rendering request result for generating AR digital signage over a network 50. Here, the plurality of user terminals 200_1, 200_2, and 200_3 may include a terminal of an authorized operator (e.g., a registered driver or the like) and/or a user who can receive an AR rendering request result for generating AR digital signage.

In an embodiment, the information processing system 800 may include one or more server apparatuses and/or databases capable of storing, providing, and executing computer-executable programs (e.g., downloadable applications) and data related to the generation of AR digital signage or one or more distributed computing devices and/or distributed databases based on cloud computing service.

The result of the rendering request for the AR digital signage provided by the information processing system 800 may be provided to a user through an application related to the provision of AR digital signage, a route guidance application, a mobile browser application, a web browser, or a web browser extension program which is installed in the user terminals 200_1, 200_2, and 200_3.

For example, the information processing system 800 may provide information corresponding to an AR digital signage provision request received from the user terminals 200_1, 200_2, and 200_3 through the route guidance application, or the like, or may perform a corresponding process.

The plurality of user terminals 200_1, 200_2, and 200_3 may communicate with the information processing system 800 over the network 50. The network 50 may be configured to enable communication between the information processing system 800 and the plurality of user terminals 200_1, 200_2, and 200_3. For example, depending on the installation environments, the network 50 may be configured as a wired network such as Ethernet, wired home network (power line communication), a telephone line communication device, an RS-serial communication, a wireless network such as a mobile communication network, wireless LAN (WLAN), Wi-Fi, Bluetooth, and Zigbee, or a combination thereof. The communication scheme is not limited to the above networks and may include short-range wireless communication between the user terminals 200_1, 200_2, and 200_3 as well as a communication scheme that utilizes a communication network (e.g., a mobile communication network, the wired Internet, the wireless Internet, a broadcast network, a satellite network, etc.).

In FIG. 9, the plurality of user terminals 200_1, 200_2, and 200_3 may be any computing device that is capable of wired and/or wireless communication and in which an application related to the provision of AR digital signage, a route guidance application, a mobile browser application, a web browser, or a web browser extension program can be installed and executed.

For example, the user terminal may include an AI speaker, a smartphone, a mobile phone, a navigation system, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, a set-top box, and the like.

Alternatively, for example, the user terminal may be a vehicle display device such as a CID, a cluster, a HUD, a room mirror display, an RSE, etc.

Also, the three user terminals 200_1, 200_2, and 200_3 are illustrated in FIG. 9 as communicating with the information processing system 800 through the network 50, but the present invention is not limited thereto. A different number of user terminals may be configured to communicate with the information processing system 800 via the network 50.

For example, the information processing system 800 may receive a request for route guidance or a request for the provision of AR digital signage from the plurality of user terminals 200_1, 200_2, and 200_3. The information processing system 800 may collect and merge information for generating AR digital signage in response to the received request, render the information in a display area to be displayed with AR signage, and provide the rendered information to the plurality of user terminals 200_1, 200_2, and 200_3.

Specifically, the information processing system 800 may receive sensing data of the vehicle 100 (see FIG. 8), request the cloud server to provide map information associated with the received vehicle sensing data, and receive and store the map information. The information processing system 800 may detect a building area including a plurality of pieces of POI information, calculate spatial coordinates of the detected building area, and acquire floor number information for each of the plurality of pieces of POI information on the basis of the received map information.

Also, the information processing system 800 may calculate the reference point of the building area for displaying content information related to the plurality of pieces of POI information on the basis of the sensing data of the vehicle and the spatial coordinate and floor number information of the building area. Also, the information processing system 800 may perform a rendering request to display AR digital signage corresponding to the content information related to the plurality of pieces of POI information in the display area determined based on the calculated reference point. Here, the rendering request may be performed by an AR engine, and the AR engine can be understood as referring to the operation of processors of the user terminals 200_1, 200_2, 200_3, a processor of an electric device embedded in the vehicle, a processor of the information processing system 800, or a processor of a linked apparatus, server, or system.

Subsequently, the information processing system 800 may transmit the result of the AR rendering request to the user terminals 200_1, 200_2, and 200_3 and may transmit an image correction request such that the user terminals 200_1, 200_2, and 200_3 map an image of the AR digital signage corresponding to the result of the rendering request to a display area of a building in a driving image acquired through a vision sensor on a floor-by-floor basis. The user terminals 200_1, 200_2, and 200_3 may map and output the image of the AR digital signage to the display area of the building in the driving image on a floor-by-floor basis and/or may map and output the image of the AR digital signage on a floor-by-floor basis in response to the image correction request received from the information processing system 800.

Figure 10:
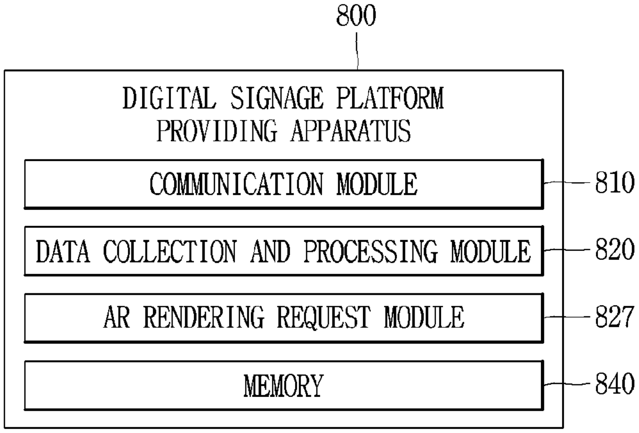
FIG. 10 is a diagram illustrating a configuration of a digital signage platform providing apparatus according to an embodiment of the present invention.

FIG. 10 is a diagram illustrating a configuration of the digital signage platform providing apparatus 800 according to an embodiment of the present invention.

In some embodiments, the digital signage platform providing apparatus 800 may be implemented as a device embedded in the navigation system 770 or the user terminal 200 embedded in or linked with the vehicle 100, as described above. Also, in some embodiments, the digital signage platform providing apparatus 800 may be implemented as a platform provided by the cloud server. Also, in other embodiments, the digital signage platform providing apparatus 800 may be implemented in the form of a separate terminal, device, system, or program independent of the vehicle 100 and the cloud server.

Referring to FIG. 10, the digital signage platform providing apparatus 800 according to an embodiment of the present invention may include a communication module 810, a data collection and processing module 820, an AR rendering request module 830, and a memory 840. However, the present invention is not limited thereto, and the digital signage platform providing apparatus 800 may include fewer elements or more elements. For example, the digital signage platform providing apparatus 800 may include an additional element such as an AR engine formed to perform rendering.

The communication module 810 is formed so that the digital signage platform providing apparatus 800 can communicate with the cloud server 900 (see FIG. 8), the vehicle 100, and the user terminal 200. For example, in order to perform communication, the digital signage platform providing apparatus 800 may include at least one or a transmitting antenna, a receiving antenna, and a radio frequency (RF) circuit and an RF device capable of implementing various communication protocols or may include a wired or wireless interface device.

The data collection and processing module 820 collects, filters, and processes information that is related to vehicle sensing data, image data, a user input request, map information, and content information such as the location, the number of floors, and advertisements of the building area including the plurality of pieces of POI information received through the communication module 810. Also, the information collection and processing module 820 may perform a series of operations for filtering, processing, and merging one or more pieces of information to generate AR digital signage corresponding to the content information related to the plurality of pieces of POI information.

The AR rendering request module 830 performs a rendering request to generate AR digital signage corresponding to the plurality of pieces of POI information. The AR rendering request module 830 causes the AR engine to, in operative association with a route guidance map of the vehicle, match the viewpoint (first viewpoint) of the driving image or the actual driving road view to the viewpoint (second viewpoint) of the screen in which the AR digital signage is to be rendered, determine the display area in which the AR digital signage is to be rendered, and vary or update the display area continuously or in real time.

The memory 840 includes programs and instructions related to the overall operation of the digital signage platform providing apparatus 800. The memory 840 is communicatively connected to at least one processor (not shown), and the at least one processor may execute a program implemented with at least one computer-readable instructions included in the memory 840.

To this end, the memory 840 may include instructions for, in response to a request received from the user terminal, receiving sensing data of the vehicle linked with the user terminal and requesting the cloud server to provide map information associated with the sensing data of the vehicle. Also, the memory 840 may include instructions for calculating spatial coordinates of the building area including the plurality of pieces of POI information from the map information received from the cloud server and acquiring floor number information for each of the plurality of pieces of POI information on the basis of the spatial coordinates. Also, the memory 840 may include instructions for calculating the reference point of the building area in which the content information related to the plurality of pieces of POI information is to be displayed, on the basis of the sensing data of the vehicle and the floor number information and the spatial coordinates of the building area. Also, the memory 840 may include instructions for performing a rendering request to display AR digital signage corresponding to the content information in a display area determined based on the calculated reference point (i.e., a location in which an AR object is to be rendered). Also, the memory 840 may include instructions for transmitting the result of the rendering request to the user terminal and performing an image correction request to allow the user terminal to map the image of the AR digital signage corresponding to the result of the rendering request to the display area in the driving area acquired through the vision sensor on a floor-by-floor basis.

Meanwhile, the digital signage platform providing apparatus 800 configured to include such a configuration or function may be implemented as a part of a device or system embedded in the vehicle 100, implemented as a separate device or system, or embedded in the user terminal (or the user interface device 200 (see FIG. 7) or the navigation system 770).

Figure 11:
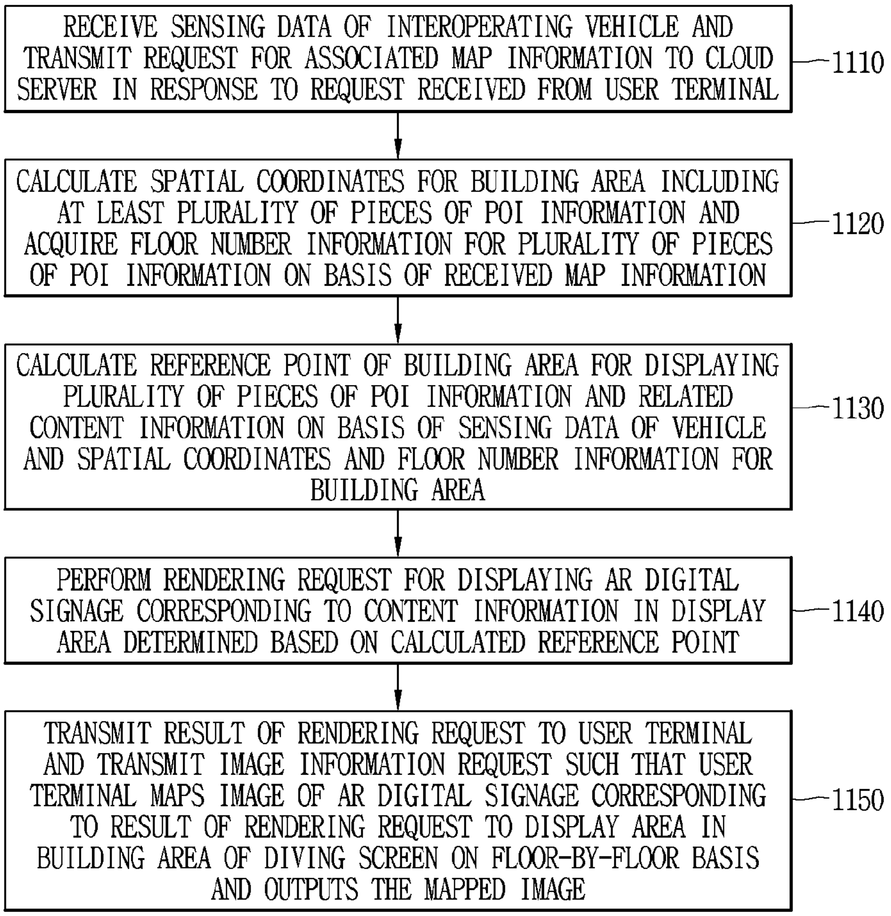
FIG. 11 is a representative flowchart illustrating an operating method of a digital signage platform providing apparatus according to an embodiment of the present invention.

FIG. 11 is a representative flowchart illustrating an operating method 1100 of a digital signage platform providing apparatus according to an embodiment of the present invention.

The operating method 1100 of FIG. 11 may be implemented by a processor provided in the digital signage platform providing apparatus 800 or a processor provided in a user terminal (or a vehicular electronic device or system of a vehicle, a cloud server, etc.) communicatively connected to the digital signage platform providing apparatus 800 and may provide a platform for generating AR digital signage.

Referring to FIG. 11, the operating method 1100 is disclosed as including receiving, by the digital signage platform providing apparatus, sensing data of a linked vehicle and transmitting a request for associated map information to the cloud server in response to a request received from the user terminal (1110).

In an embodiment, the map information may include POI information and 2D/3D map information included within a predetermined range based on the current location of the vehicle. In another embodiment, the map information may be a driving image captured through a vision sensor, such as a camera, of the vehicle.

The digital signage platform providing apparatus calculates spatial coordinates of the building area including the plurality of pieces of POI information from the received map information and acquires floor number information for each of the plurality of pieces of POI information (1120).

For example, when a building including a plurality of POIs is detected or recognized from the map information by the processor of the digital signage platform providing apparatus, the digital signage platform providing apparatus may calculate X, Y, Z coordinate information of the building as the spatial coordinates.

In one embodiment, when the map information is 2D/3D map information received from the cloud server, the digital signage platform providing apparatus may receive the information regarding the location, height, and number of floors of the building area including the plurality of pieces of POI information on the basis of the map information and calculate the spatial coordinates of the building area. In another embodiment, when the map information is a driving image acquired through a camera provided in the vehicle, the digital signage platform providing apparatus may estimate the location, height, and number of floors of the building area on the basis of the driving image and estimate the spatial coordinates from the location, height, and number of floors.

In this way, when the spatial coordinates of the building area are calculated, the digital signage platform providing apparatus may calculate or estimate floor number information for each of the plurality of pieces of POI information included in the building area. For example, the digital signage platform providing apparatus may calculate a floor-by-floor height value, i.e., a height offset on the basis of the height and number of floors of the building included in the spatial coordinates of the building area and may compute or estimate the number of floors corresponding to the plurality of pieces of POI information on the basis of the calculated height offset.

Subsequently, the digital signage platform providing apparatus calculates a reference point for displaying content information related to the plurality of pieces of POI information on the basis of the sensing data of the vehicle and the spatial coordinates and floor number information of the building area (1130).

Here, POI-related content information may refer to a brand icon, a 3D model, a still image, or a moving image for POI-related advertisement exposure.

The reference point of the building area for displaying the content information may be calculated by matching the information regarding the vehicle sensing data (the vehicle's driving speed and direction), the spatial coordinates of the building area, and the floor number information of the plurality of pieces of POI information to correspond to the driving image. That is, by using AR technology, the viewpoint of the driving image or the actual driving road view (e.g., in the case of an AR navigation device in which AR digital signage is projected on a windshield through a laser sensor) and the content information are matched to the viewpoint of the screen for finding the reference point of the building area for displaying the content information.

In an embodiment for example, the reference point may be determined as a coordinate point of the building which is located closest to the current location of the vehicle among the spatial coordinates of the building area on the basis of the driving direction of the vehicle.

In an embodiment, the display area for each of the plurality of pieces of POI information is obtained by applying a height offset corresponding to the floor number information corresponding to the POI information with respect to the reference point. The display area of each POI information having different floor number information may be obtained by using a multiple of the height offset corresponding to the corresponding floor information with respect to the reference point.

In an embodiment, the coordinate point closest to the current location of the vehicle may be acquired or estimated by detecting edges of the building identified using coordinate data included in the map information or camera sensing information provided by the vehicle. In this case, a reference point for each piece of content information corresponding to the plurality of pieces of POI information (hereinafter referred to as a "floorwise reference point") may be set as the reference point+a height offset corresponding to a floor number matched to each piece of POI information. That is, a floorwise reference point is calculated for and applied to each of the plurality of pieces of content information.

The digital signage platform providing apparatus performs an AR rendering request to display AR digital signage corresponding to the content information in a display area determined based on the calculated reference point (1140).

In this regard, the digital signage platform providing apparatus may determine display areas for mapping a plurality of pieces of AR digital signage matched to the plurality of pieces of POI information to corresponding floors of the building.

Specifically, the digital signage platform providing apparatus may determine the display areas of the plurality of pieces of AR digital signage corresponding to the plurality of pieces of POI information using floor number information matched to the plurality of pieces of POI information and height information of the building area calculated based on the spatial coordinates for the building area.

In an embodiment, when the spatial coordinates for the building area cannot be acquired based on the map information, the digital signage platform providing apparatus may determine a display area to which the content information is to be mapped by using floor number information and height information of the building area estimated using the camera sensing information included in the vehicle sensing information.

Meanwhile, according to an embodiment of the present invention, the AR rendering request performed by the digital signage platform providing apparatus is performed by an AR engine. The AR engine may be implemented by a processor of the digital signage platform providing apparatus, a processor of the user terminal, a processor of another vehicular electronic device or system of the vehicle, or a cloud server.

When rendering is performed through the AR engine as described above, the digital signage platform providing apparatus transmits a result of the rendering request to the user terminal. Thus, the digital signage platform providing apparatus transmits an image correction request to the user terminal so that the user terminal maps an image of AR digital signage corresponding to the result of the rendering request to a display area of the building in the driving image acquired through the vision sensor on a floor-by-floor basis and then outputs the image (1150).

In an embodiment, the image correction request may be a request for mapping the image of the AR digital signage so that each display area matched to a corresponding piece of content information is moved from the calculated reference point by the height corresponding to the floor number information. This will be described in detail below with reference to FIGS. 12 and 13.

Also, in an embodiment, the image correction request may be a request to map, on a floor-by-floor basis, AR digital signage to a display area that is changed based on the reference point (or a floorwise reference point) and the driving direction and speed of the vehicle. A specific example thereof will be described in detail below with reference to FIGS. 14 and 15.

Figure 12:
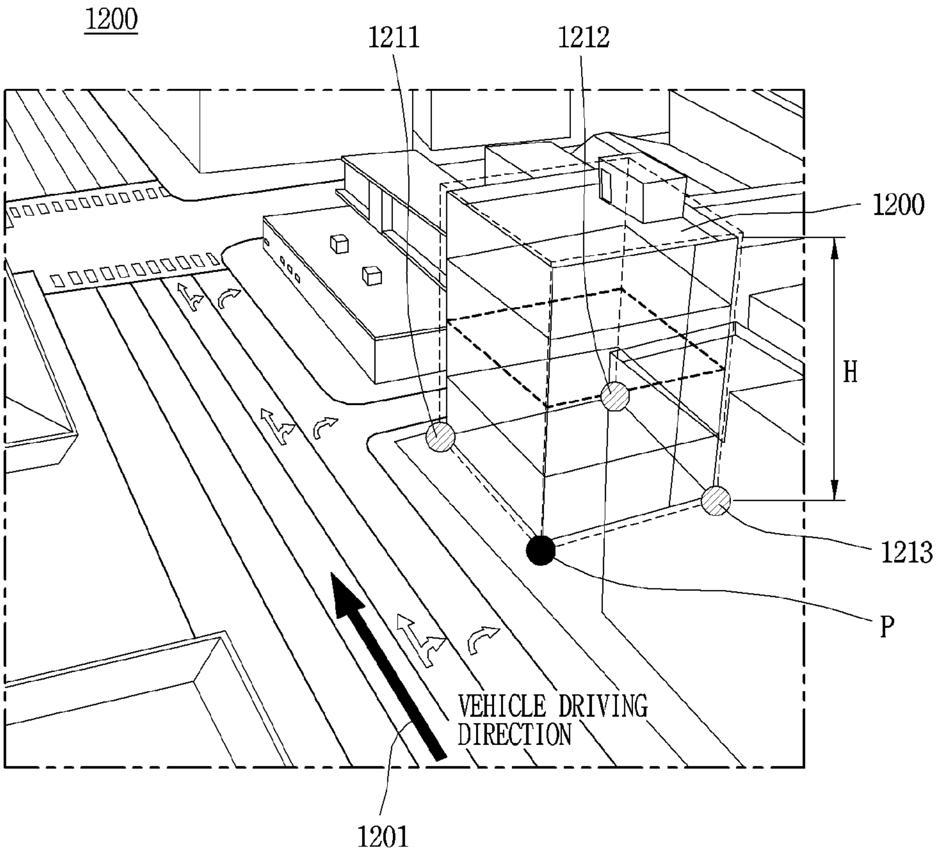
FIGS. 12 and 13 are diagrams illustrating a method of arranging AR digital signage in a building area of a driving image on a floor-by-floor basis according to an embodiment of the present invention.
Figure 13:
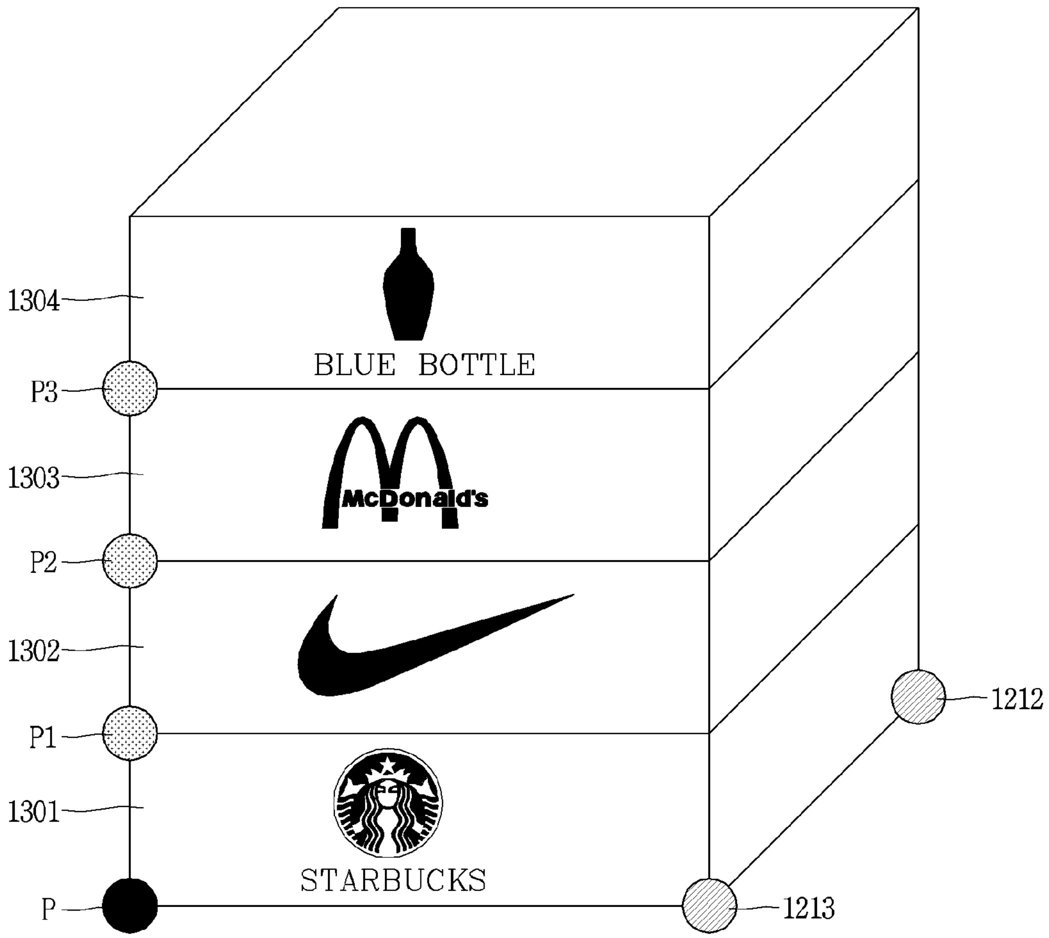

FIGS. 12 and 13 are diagrams illustrating a method of arranging AR digital signage on a floor-by-floor basis in a building area of a driving image according to an embodiment of the present invention.

The method of arranging AR digital signage on a floor-by-floor basis in a building area of a driving image may be implemented by a processor of the digital signage platform apparatus according to the present invention. Alternatively, as another example, the method may be implemented by a processor of a vehicle display device (e.g., a user interface device, navigation system, or the like provided in a vehicle) including a digital signage platform or may be implemented by a communicatively connected cloud server.

Referring to 12, when a building area 1200 having associated with it a plurality of pieces of POI information is detected, the digital signage platform providing apparatus according to the present invention may calculate (or estimate) spatial coordinates 1211, 1212, 1213, and P for the building areas on the basis of the map information (e.g., 2D/3D map information, the number of floors of the building area, and height information, etc.) or the driving image acquired through a camera provided in the vehicle.

The digital signage platform providing apparatus may obtain a reference point P to be used as an origin point for mapping AR digital signage to the driving image on a floor-by-floor basis by using the sensing data of the vehicle (e.g., a vehicle driving direction), the spatial coordinates 1211, 1212, 1213, and P, and the information on the height and number of floors of the building included in the map information (or estimated through the detection of edges of the driving image).

That is, considering the driving direction 1201 of the vehicle among the spatial coordinates 1211, 1213, 1213, and P of the building area, reference coordinates closest to the location of the vehicle included in the sensing data of the vehicle is set as the reference point P.

For example, when the information on the number of floors and height of the building area 1200 can be acquired, the digital signage platform providing apparatus may calculate the origin P considering the driving direction of the vehicle. However, when the map information for the building area 1200 is not present (or is not recognized) or when the information on the number of floors and height cannot be acquired, the digital signage platform providing apparatus may extract the origin of the building area by estimating the number of floors and height of the building from the image of the building using the sensing information of the camera provided in the vehicle and detecting edges of the image. In this case, the height for each floor may use a predefined value.

Meanwhile, in order to display a plurality of pieces of AR digital signage on a floor-by-floor basis, a "floorwise reference point" should be calculated for each of the plurality of pieces of AR digital signage.

In this regard, referring to FIG. 13, the "floorwise reference point" for each of the plurality of pieces of AR digital signage may be obtained by using the height corresponding to the number of floors for each of the POI information with respect to the origin P and the spatial coordinates 1211, 1212, 1213, and P of the building area. That is, the digital signage platform providing apparatus determines, as a "floorwise reference point," a location along the height of the building equivalent to a height offset corresponding to the number of floors for a particular POI information applied to the origin P, and requests correction such that corresponding AR digital signage is mapped to the location.

For example, in FIG. 13, the reference point of first AR digital signage 1301 displayed on the first floor of the building area 1200 is determined as the origin P. The floorwise reference point of second AR digital signage 1302 displayed on the second floor of the building area 1200 is determined as a point P1 obtained by applying a height offset corresponding to the second floor to the origin P. Also, the floorwise reference points of third AR digital signage and fourth AR digital signage displayed on the third floor and the fourth floor of the building area 1200 are determined as points P2 and P3, again obtained by applying the height offsets corresponding to the third floor and the fourth floor to the origin P.

In order to more accurately calculate the height information of the building area, in one embodiment, the digital signage platform providing apparatus may compare the height information (e.g., an interfloor height offset) of each display area determined based on the floorwise reference points and the height information included in the map information (e.g., 2D/3D map information) received from the cloud server and may correct at least one of the location and shape of each display area on the basis of the comparison result. Also, in an embodiment, when the detected difference between (1) the height information and the value of a set of interfloor heights that are initially calculated and (2) the height information of the building area acquired through a database (DB) is greater than or equal to a threshold value (a normal error range), the digital signage platform providing apparatus may correct the location of each display area using the height information of the database (DB).

For example, the digital signage platform providing apparatus may change the interfloor height offset described with reference to FIG. 13. Alternatively, the digital signage platform providing apparatus may, for example, map a plurality of pieces of AR digital signage 1301, 1302, 1303, and 1304 to the lateral side, not the front side, of the building area 1200 in FIG. 13 on a floor-by-floor basis.

Meanwhile, in an embodiment, the plurality of pieces of AR digital signage 1301, 1302, 1303, and 1304 mapped to the building area 1200 on a floor-by-floor basis surround at least one side of each display area of the building in the driving image. For example, in FIG. 13, the plurality of pieces of AR digital signage 1301, 1302, 1303, and 1304 are formed to surround the front side of the building area 1200 on a floor-by-floor basis. Accordingly, a plurality of advertisement exposure effects are provided to one building on a floor-by-floor basis, and this gives a realistic feeling as if a real signage signboard is placed on the building.

Example embodiments of naturally and variably providing images of a plurality of pieces of augmented reality (AR) digital signage by considering various changes in a building's shape based on a driver's varying viewing angle (or a vehicle's front viewing angle), a vehicle driving situation, a driver's personal tendency, or nearby traffic and structural environments will be described below.

As described above, when AR digital signage such as an actual signage electric signboard is provided on one side of a building area on a floor-by-floor basis, a realistic feeling is further increased. However, since it does not reflect vehicle driving or nearby situations, there is a limitation in that exposure time of the driver or passengers to the advertising materials may be short.

In addition, when AR digital signage is always mapped to a specific display area of a building (e.g., the front of a building), the size of the specific display area may decrease or disappear from view depending on the current location and driving direction of the vehicle. In this case, the advertising exposure time of AR digital signage is further reduced.

Furthermore, when the specific display area to which the AR digital signage is mapped is obscured by a structure, the AR digital signage may not be recognized at all. That is, as the visibility of AR digital signage is not reduced or obstructed, the advertising effect is reduced.

Figure 14:
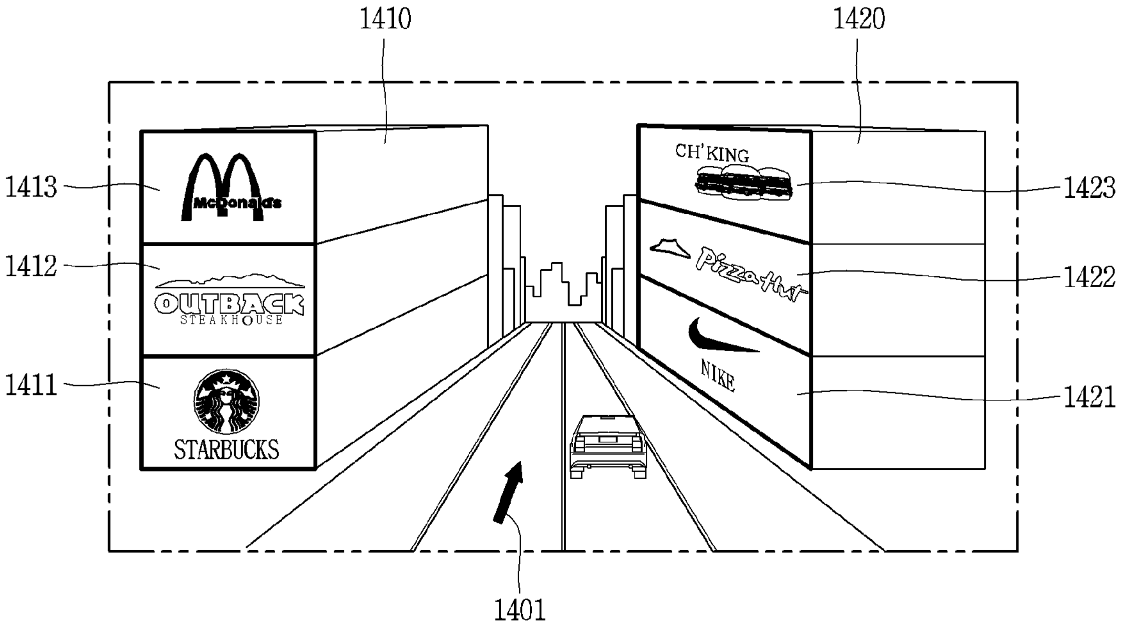
FIG. 14 is a diagram illustrating a method of selecting a display area of floorwise augmented reality (AR) digital signage on the basis of the shape of a building area according to an embodiment of the present invention.

FIG. 14 is a diagram illustrating a method of selecting a display area of floorwise AR digital signage on the basis of the shape of a building area according to an embodiment of the present invention.

In the present disclosure, the form of a building area or the shape of an image of a building area refers to the shape of the front and lateral sides of the building area varying in real time with respect to a driver's view (or a vehicle's front view) in two dimensions. Also, the shape of the front and lateral sides of the building area may be expressed as numerical information about the front and lateral sides of the building area varying in real time with respect to a driver's view (or a vehicle's front view) in two dimensions.

Here, the driver's view (or the vehicle's front view) may be assumed to coincide with the driving direction of the vehicle. Also, here, the numerical information may include, for example, the areas of the front and lateral sides of the building area, a ratio relating to the area, a distortion ratio.

In an embodiment, the display device 200 according to the present invention may determine a display area of AR digital signage on the basis of an image of the building area in the driving image. When the display area is changed based on the shape of the image of the building area, the display device 200 may map the AR digital signage to the changed displayed area and display the mapped AR digital signage.

Here, the determining of the display area based on the image of the building area may refer to the display device 200 determining the display position of floorwise AR digital signage on the side of a building in a driving image acquired through a vision sensor by communication with a system including the above-described digital signage platform providing device 800 and the vehicle 100.

The display position may be one of the front side or the lateral side of the building area. In the present disclosure, the display position may be determined to be advantageous in securing the visibility of the AR digital signage.

Also, here, the changing of the display area based on the shape of the image of the building area may refer to the display device 200 changing the display position of floorwise AR digital signage from the front side (or the lateral side) of the building in the driving image acquired through the vision sensor to the lateral side (or the front side) or to other nearby locations by communication with a system including the above-described digital signage platform providing device 800 and the vehicle 100.

The changed display position may include other nearby locations outside the building as well as another side such as the front side or the lateral side of the building area. In the present disclosure, the changed display position is determined to be a side that is advantageous in securing the visibility of the AR digital signage.

To this end, the display device 200 receives, from the vehicle 100, vehicle sensing data including driving-related information (e.g., the driving direction and driving speed of the vehicle, etc.) and information on the driving image acquired through the vision sensor in real time. Also, the display device 200 may deliver the collected data to the digital signage platform providing system so that the digital signage platform providing system can perform data collection, processing, filtering, and merging for displaying the AR digital signage on the determined or changed display area on a floor-by-floor basis and perform an AR rendering request.

Referring to FIG. 14, for example, while the vehicle is driving, building area A 1410 and building area B 1420 on the left and right sides of the driving road, respectively, each include a plurality of pieces of POI information in the displayed driving image. A first plurality of pieces of AR digital signage 1411, 1412, and 1413 are mapped to building area A 1410 on a floor-by-floor basis, and a second plurality of pieces of AR digital signage 1421, 1422, and 1423 are mapped to building area B 1420 on a floor-by-floor basis.

The display areas of the first plurality of pieces of AR digital signage 1411, 1412, and 1413 and the second plurality of pieces of AR digital signage 1421, 1422, 1423 are determined to be positions that are advantageous in securing visibility with respect to the driving direction 1401 of the vehicle.

The first plurality of pieces of AR digital signage 1411, 1412, and 1413 and the second plurality of pieces of AR digital signage 1421, 1422, and 1423 are displayed on display areas that are advantageous in securing visibility on the front and lateral sides of the building areas 1410 and 1412, respectively. For example, the lateral side of building area A 1410 is determined as the display area of the first plurality of pieces of AR digital signage 1411, 1412, and 1413, and the front side of building area B 1420 is determined as the display area of the second plurality of pieces of AR digital signage 1421, 1422, and 1423.

This is because, based on the driving direction 1401 of the vehicle, the lateral side is more advantageous in securing visibility in the case of building area A 1410 and the front side is more advantageous in securing visibility in the case of building area B 1420.

As described above, in the present disclosure, the display device 200 may be operated to determine the display areas on the basis of the image of the building area and change the display areas on the basis of the shape of the image of the building area in order to allow different display sides of each building area in the driving image to be determined as the display areas of the floorwise AR digital signage at the same time.

To this end, the display device 200 according to the present disclosure may determine the display area on the basis of the widths (areas) of the front side and the lateral side of a building in order to determine, as the display area, a position with high visibility with respect to the driving direction of the vehicle.

In an embodiment, the display device 200 may compare the difference between the widths (areas) of the front side and the lateral side of the building area to a preset critical value and may select one of the front side and the lateral side on the basis of the comparison result. In one example, the preset critical value refers to a threshold reference value with respect to a width of a display area of a side of the building. Accordingly, the display device 200 may be limited to use only widths to determine a display area only when the difference of the widths (areas) of the front side and the lateral side of the building area exceeds the preset critical value.

For example, when the difference between the widths of the front side and the lateral side of the building area exceeds the preset critical value, the display device 200 may select the wider one of the front side and the lateral side of the building area as the display area. On the other hand, when the difference between the widths of the front side and the lateral side of the building area falls below the preset critical value, the display device 200 may determine a preset position (e.g., the front side of the building area) as the display area or may display the display area on the basis of another selection criterion.

In an embodiment, when the difference between the widths (areas) of the front side and the lateral side of the building area falls below the preset critical value, the display device 200 may select one of the front side and the lateral side of the building area as the display area on the basis of the image distortion ratio of the floorwise AR digital signage.

For example, when the difference between the widths of the front side and the lateral side of the building area falls below the preset critical value, the display device 200 may select one of the front side and the lateral side of the building area in which the image distortion ratio of the floorwise AR digital signage is smaller. Alternatively, the display device 200 may select one of the front side and the lateral side of the building area in which the distortion ratio of text included in the floorwise AR digital signage is smaller. Here, the image distortion ratio of the front side and the lateral side of the building area and the distortion ratio of text included in the floorwise AR digital signage may be calculated after a predetermined weight is assigned to each image.

In FIG. 14, the first plurality of pieces of AR digital signage 1411, 1412, and 1413 are mapped to display areas of the lateral side of building area A 1410 in which the difference between the widths (areas) of the front side and the lateral side of the building area falls below the preset critical value and in which the image distortion ratio of the floorwise AR digital signage is smaller.

Also, in FIG. 14, the second plurality of pieces of AR digital signage 1421, 1422, and 1423 are mapped to display areas of the front side of building area B 1420 in which the difference between the widths (areas) of the front side and the lateral side of the building area exceeds the preset critical value, where the front side which has a greater width than the lateral side.

As described above, the display device 200 according to an embodiment may determine the display area for displaying the image of the floorwise AR digital signage on the basis of the image of the building area in the driving image acquired through the vision sensor by communication with the vehicle 100 and the digital signage platform providing system. Also, the display device 200 may change the selected display area on the basis of the shape of the image of the building area in the driving image acquired through the vision sensor, transmit information on the changed display area to the digital signage platform providing system, and receive a rendering result or related information for mapping an image of the AR digital signage corresponding to a newly selected (changed) display area from the corresponding system.

Also, in an embodiment, a processor of the display device may change the display area on the basis of the image distortion ratio of the building area recognized through the camera of the vehicle. In this case, by transmitting the information on the changed display area to the digital signage platform providing system, the display device may receive the rendering result or related information for displaying the AR digital signage on the changed display area on a floor-by-floor basis.

Figure 15:
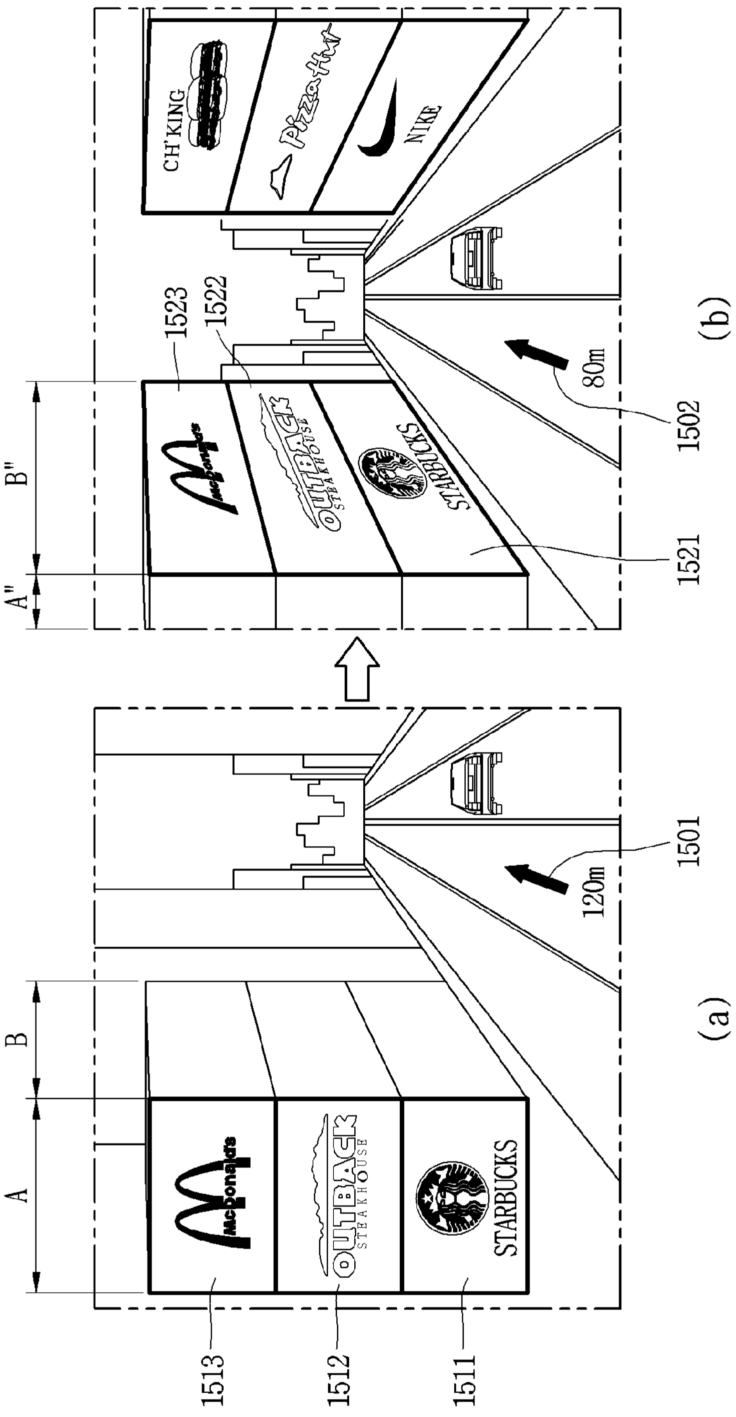
FIG. 15 is a diagram illustrating a method of selecting a display area of floorwise AR digital signage on the basis of vehicle driving information according to an embodiment of the present invention.

FIG. 15 is a diagram illustrating a method of selecting a display area of floorwise AR digital signage on the basis of vehicle driving information according to an embodiment of the present invention.

In an embodiment, even after the display area is determined and the AR digital signage is displayed on a floor-by-floor basis, the display device may calculate the widths of the front side and the lateral side of the building area as they change along with the driving of the vehicle, change the display area on the basis of the calculation result, and map the floorwise AR digital signage to the changed display area. This provides an advantageous effect of securing the visibility of AR digital signage in real time.

As described above, in order to calculate the widths of the front side and the lateral side of the building area as they change along with the driving of the vehicle, the display device 200 may calculate the widths on the basis of the change in shape of the image of the front side and the lateral side of the building acquired through the vision sensor of the vehicle.

In FIG. 15(*a*), at the beginning (at a first time point), a plurality of pieces of AR digital signage 15111, 1512, and 1513 are mapped and displayed using the lateral side of the building area in the driving image as the display area. As described above with reference to FIG. 14, since the difference between the widths A and B of the front side and the lateral side of the building area is less than or equal to the preset critical value on the basis of the current location and the driving direction 1501 of the vehicle at the first time point, the lateral side, which has a smaller image distortion ratio, is determined as the display area.

Subsequently, when the vehicle approaches the building area (a second time point after the first time point) as the vehicle is driving, as shown in FIG. 15(*b*), the display area is changed to the front side of the building area in the driving image, and a plurality of pieces of AR digital signage 1521, 1522, and 1523 are mapped and displayed on the changed display area. That is, although the display area was initially determined, the display device 200 may select a new display area by changing the display area from the lateral side to the front side according to the image of the display area of the lateral side changing along with the driving of the vehicle.

Since the difference between the widths A" and B" of the front side and the lateral side of the building area exceeds the preset critical value on the basis of the current location and the driving direction 1502 of the vehicle at the second time point, the front side, which is a greater width, may be determined as the display area.

In an embodiment, the processor of the display device 200 according to the present disclosure may change the display area to which the image of the floorwise AR digital signage is to be mapped on the basis of the sensing data of the vehicle received while the vehicle is driving.

For example, as described above with reference to FIG. 15, the display device 200 may receive the sensing data of the vehicle (e.g., the current location and driving direction of the vehicle) in real time and monitor whether the difference between the widths of the front side and the lateral side of the same building area exceeds the preset critical value.

When the monitoring result is that the difference between the width values exceeds the preset critical value, the side that has a greater width at the current time may be displayed as the display area. In this case, when the floorwise AR digital signage is currently being displayed on the side that has a smaller width, the display area may be changed. On the other hand, when the monitoring result is that the difference between the widths is less than or equal to the preset critical value, the side among the front side and the lateral side that has a smaller image distortion ratio (e.g., the side that has a smaller aspect ratio (height offset) difference) is determined as the display area. In this case, when the floorwise AR digital signage is currently displayed on the side having a larger image distortion ratio, the display area may be changed.

In an embodiment, when the areas of the front side and the lateral side of the building area in the driving image acquired through the vision sensor change along with the driving of the vehicle, the processor (or the control unit) of the display device 200 according to the present disclosure may transmit information on the change in the areas to the digital signage platform providing system based on the changed perspective from the vehicle. Here, the information on the change in the areas may include, for example, information related to the change of the display area such as the difference between the widths of the front side and the lateral side of the building area, the result of comparing the difference between the widths to the critical value, and the image distortion ratios of the front side and the lateral side.

Also, in an embodiment, the processor of the display device 200 may receive a result of a rendering request for generating AR digital signage on the basis of the information on the changed in the areas and may change the display area of the floorwise AR digital signage from one side of the building area in the driving image to another side and then perform mapping.

In an embodiment, the processor of the display device 200 may map the floorwise AR digital signage while gradually moving the floorwise digital signage from one side of the building area in the driving image to another side according to the driving direction and driving speed of the vehicle.

For example, referring to FIG. 15, when it is determined that the display area is changed from the lateral side to the front side, the first plurality of pieces of AR digital signage 1511, 1512, and 1513 that have been displayed on a floor-by-floor basis on the lateral side of the building may gradually move toward the front side along with the driving of the vehicle as shown in FIG. 15A and may be seamlessly moved and then displayed on the front side of the building after a certain period of time as shown in FIG. 15B. Thus, the advertising exposure time is increased as the digital signage is moved along the driving direction of the vehicle.

Figure 16:
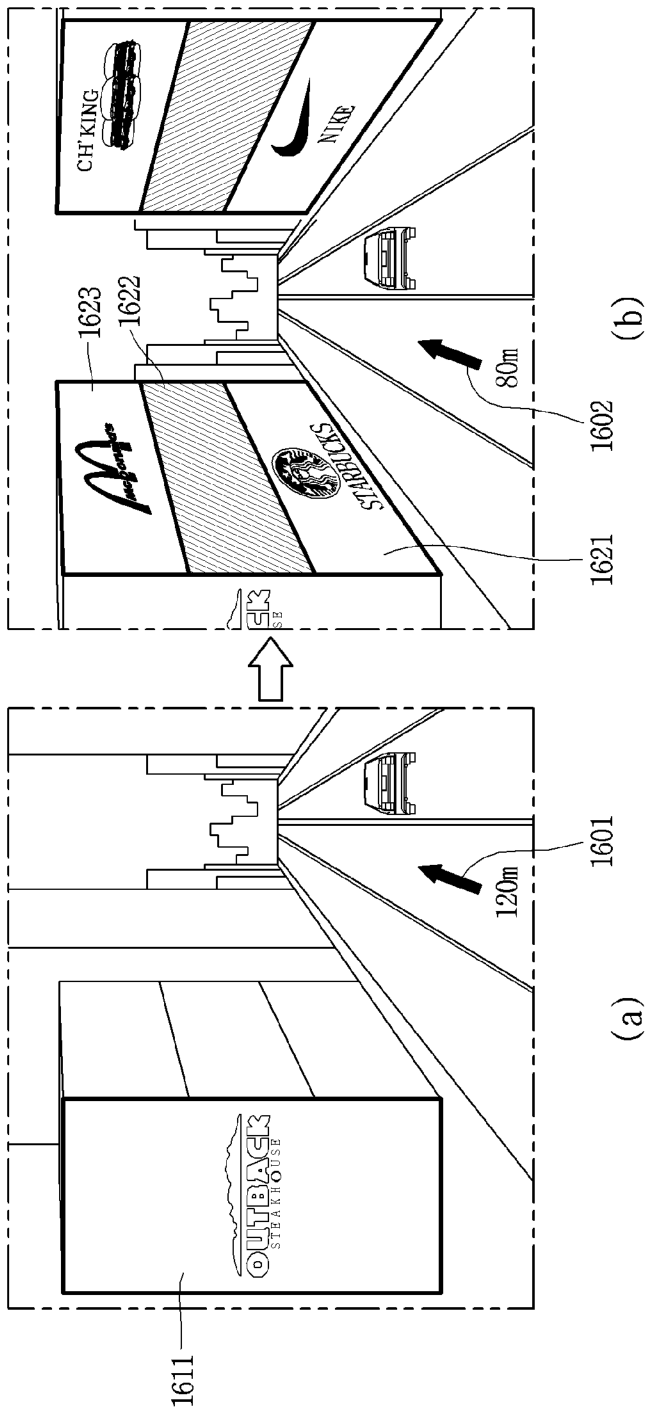
FIG. 16 is a diagram illustrating a method of selecting a display area of floorwise AR digital signage on the basis of driver preference according to an embodiment of the present invention.

FIG. 16 is a diagram illustrating a method of selecting a display area of floorwise AR digital signage on the basis of driver preference according to an embodiment of the present invention.

In the discussed embodiments, a method of displaying AR digital signage by utilizing both the front side and the lateral side of the building area is presented. This includes the use of an unselected side when one of the front side and the lateral side and side surfaces of the building area is selected or changed as the display area as described above with reference to FIGS. 14 and 15. Also, the present disclosure presents a method of increasing the exposure effect of AR digital signage matched when driver preference or advertisement service level is high.

In an embodiment, the processor of the display device 200 according to the present disclosure may transmit pre-registered preference POI information that is stored therein or collected by communicating with the vehicle 100 to the digital signage platform providing system.

In an embodiment, when one of a plurality of pieces of POI information includes pre-registered preference POI information, the processor of the display device 200 may determine one side of the building area in the driving image acquired through the vision sensor as a first display area on the basis of the information received from the corresponding system and map the image of the typical AR digital signage on a floor-by-floor basis. The processor of the display device 200 may determine the other side as a second display area and map and display the AR digital signage corresponding to the preference POI information. In this case, when there are a plurality of pieces of preference POI information, a plurality of pieces of AR digital signage corresponding to the preference POI information may be mapped to the second display area on a floor-by-floor basis (or across a plurality of floors). That is, by allowing AR digital signage matched to the pre-registered preference POI information to be exposed across a plurality of floors of the building, it is possible to increase advertising exposure.

Here, the first display area may be one of the front side and the lateral side of the building area that is a position with better visibility. For example, the first display area may refer to a side among the front side and the lateral side of the building area that has a greater width or that has a smaller image distortion ratio. In this case, the second display area may be another side of the building area different from the first display area.

Meanwhile, the order of determination of the first and second display areas may not be fixed, and in some embodiments, the second display area to which the AR digital signage matched to the preference POI information is to be mapped is determined first, and the corresponding AR digital signage may be displayed in the entirety of the second display area.

In this case, the second display area may refer to an area closer to the current location of the vehicle (a location that comes into view first), and the first display area may be an area farther from the current location of the vehicle or an optimal display area determined at a certain time after the second display area is determined.

For example, as shown in FIG. 16A, the processor of the display device 200 may determine the lateral side, which closer to the current location of the vehicle than the front side, as the second display area on the basis of the current location and the driving direction 1601 of the vehicle at the first time point, and may map AR digital signage 1611 corresponding to preference POI information to the lateral side.

Subsequently, as shown in FIG. 16B, the processor of the display device 200 may determine the front side of the building, which is the other one of the front side and the lateral side of the building in the driving image and which has optimal visibility, as the first display area on the basis of the current location and the driving direction 1602 of the vehicle at the second time point, which is at a certain time after the first time point, and may map and display a plurality of pieces of AR digital signage 1621, 1622, and 1623 on a floor-by-floor basis. The AR digital signage 1611 matched to the preference POI information may continue to be included in the first display area.

In this case, by continuously mapping and displaying the AR digital signage 1611 corresponding to the preference POI information in the second display area, an advertisement related to the preference POI information may be exposed to a plurality of surfaces of the building.

Meanwhile, in FIG. 16B, when the AR digital signage 1611 matched to the preference POI information and the other pieces of AR digital signage 1621 and 1623 are displayed on a floor-by-floor basis, the AR digital signage 1611 is regarded as signage with a higher advertisement service level. Accordingly, for visual distinction, highlights such as unusual colors, border marks, and flickering may be included in the floor of the corresponding AR digital signage 1611 during the mapping.

On the other hand, corresponding AR digital signage classified as non-preferred POI information 1622 based on the driver or the collected information may be displayed in a smaller size, not displayed at all, or displayed with some information hidden to reduce advertising exposure during the mapping.

Meanwhile, although the front side and the lateral side of the building are targeted in relation to the determination or change of the display area, the present invention is not limited thereto. For example, it may be understood that the front side (the direction of the entrance) of the building includes the rear side of the building, which is opposite to the front side. In this case, even when the vehicle enters an alleyway where the rear side of the building is exposed, a plurality of pieces of AR digital signage are displayed on a floor-by-floor basis as described above, and thus it is possible to more easily recognize preference/destination POI locations.

Figure 17A:
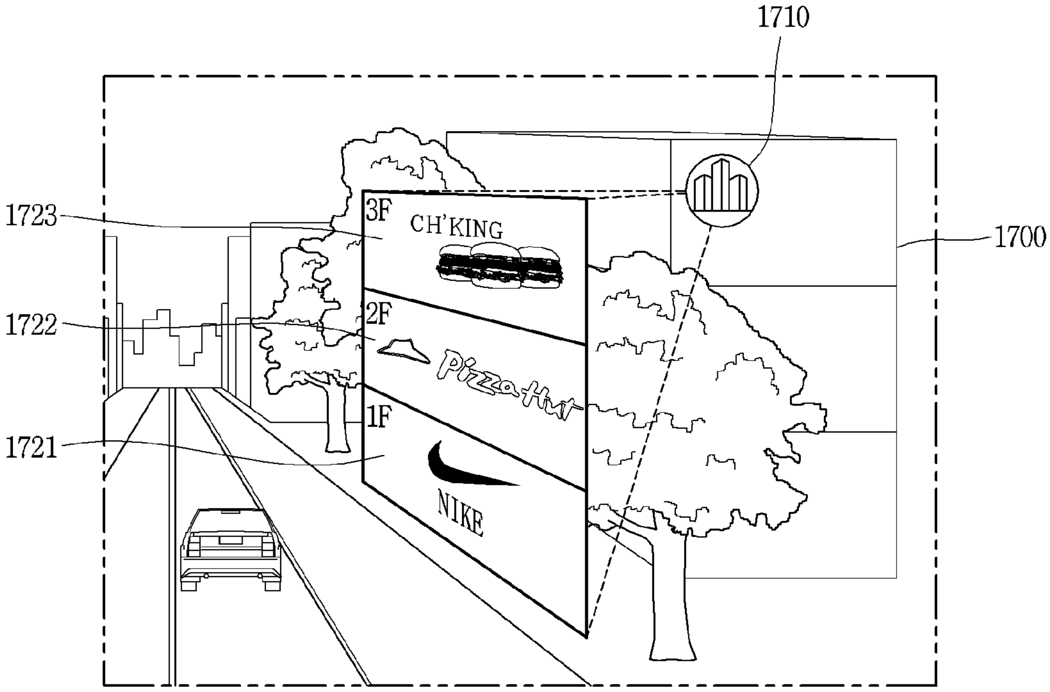
FIGS. 17A, 17B, and 17C are diagrams illustrating various methods of varying a display area of floorwise AR digital signage on the basis of vehicle surrounding situation information according to embodiments of the present invention.
Figure 17B:
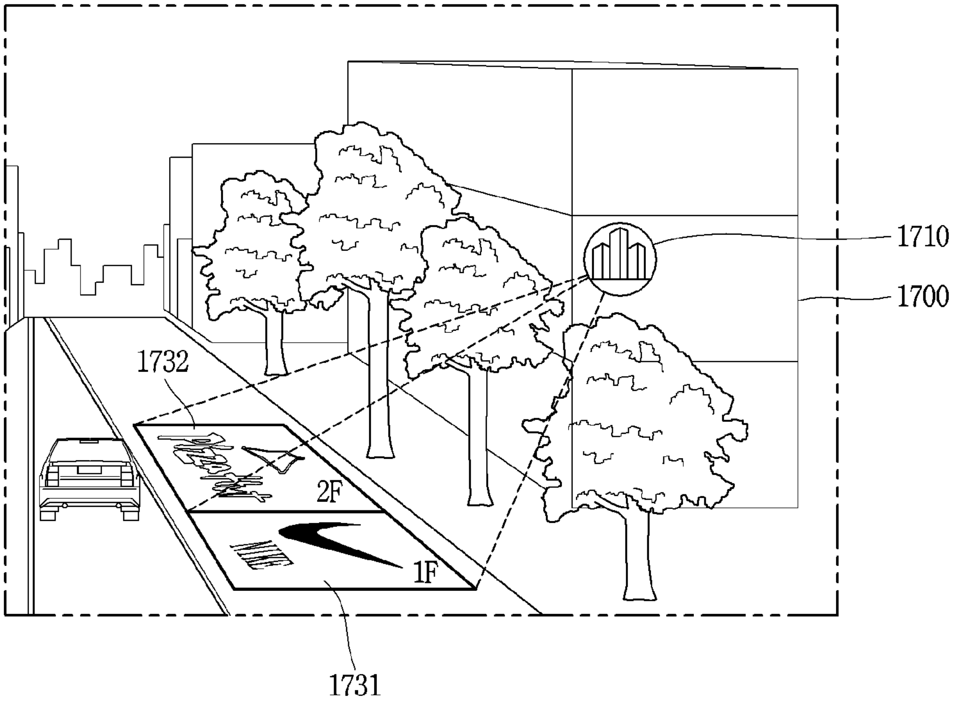
Figure 17C:
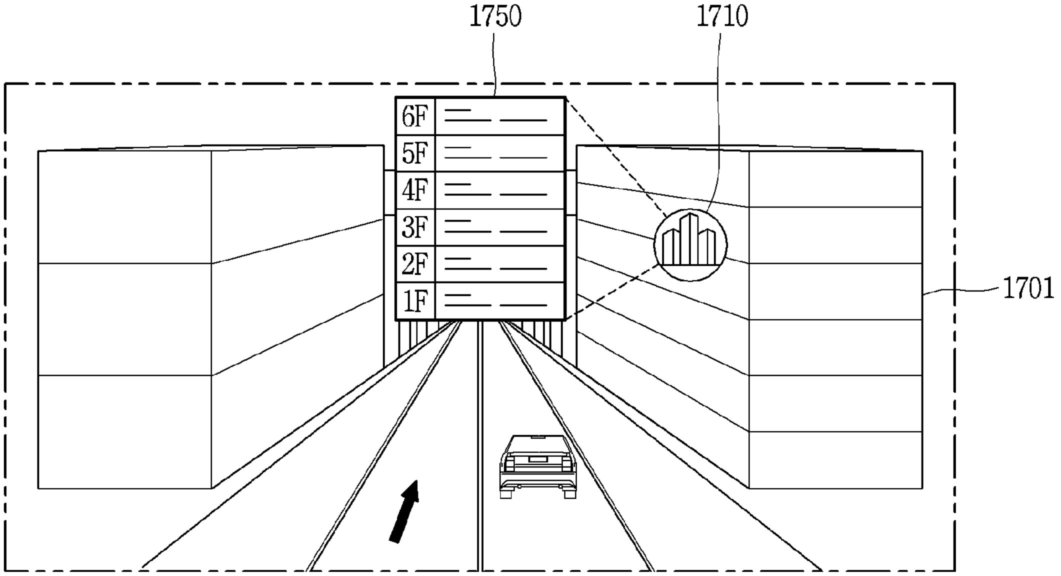

FIGS. 17A, 17B, and 17C are diagrams illustrating various methods of changing a display area of floorwise AR digital signage on the basis of vehicle surrounding situation information according to embodiments of the present invention. In particular, these embodiments are examples in which the display area is changed to a different location around the building area other than the surfaces of the building.

Specifically, FIG. 17A shows an embodiment of changing the display area of floorwise AR digital signage when destination POI information is associated with the building and the vehicle approaches the building or when the vehicle intends to enter the building. 17B shows an embodiment of changing the display area of floorwise AR digital signage to another location when visibility is not secured because the building is obscured by another structure. Also, 17C shows an embodiment of changing the display area of floorwise AR digital signage to a location other than the building in the case of a special building such as a high-rise building (e.g., a building with ten or more floors).

Referring to FIG. 17A, as the vehicle approaches a building area 1700, at least a part of the building area 1700 in the driving image acquired through the vision sensor may be obscured or difficult to recognize. Specifically, the size of the AR digital signage and the image of the building increase together or proportionally as the vehicle approaches the building area 1700. However, when the vehicle approaches or attempts to enter the building area 1700, some floors (e.g., upper floors) of the building area 1700 or a part of the AR digital signage deviates from the driving image.

Accordingly, in order to improve the driver's visibility, as shown in FIG. 17A, an icon 1710 indicating a building location is displayed in the building area 1700, and a plurality of pieces of AR digital signage 1721, 1722, and 1723 are displayed on a floor-by-floor basis and are mapped and displayed at an adjacent location other than the building area 1700.

In an embodiment, an alternate display area corresponding to another location adjacent to the building area may be one of a road edge adjacent to the building area, a guard rail, a sidewalk area adjacent to the building area, or the surface of a driving road.

In this case, a height offsets of the alternate display area may be set to be a value smaller than a height offset corresponding to a previous display area of the building area in order to secure visibility. Alternatively, the plurality of pieces of AR digital signage 1721, 1722, and 1723 may be displayed by reducing their overall size compared to the size of the building area 1700 so that the image of the signage is not distorted. Alternatively, the plurality of pieces of AR digital signage 1721, 1722, and 1723 may be displayed by reducing the type of content and/or the amount of information.

On the other hand, as shown in FIG. 17A, lines (dotted lines) may indicate the relationships between the plurality of pieces of AR digital signage 1721, 1722, and 1723 and the icon 1710 indicating the building location.

Also, although not shown, when the vehicle attempts to further approach or enter the building area 1700 in the display state of FIG. 17A, the plurality of pieces of AR digital signage 1721, 1722, and 1723 may be further reduced correspondingly on the basis of the distance between the building area 1700 and the current location of the vehicle.

Alternatively, in another example, only AR digital signage matched to preference POI information or destination POI information among the plurality of pieces of AR digital signage 1721, 1722, and 1723 may be displayed.

To this end, the processor of the display device 200 according to the present invention transmits information on the destination of the vehicle to the digital signage platform providing system and may map the image of the corresponding AR digital signage matched to the destination of the vehicle to the display area so that the AR digital signage is visually distinct from other AR objects when one of a plurality of pieces of POI information included in the building area is set as the destination.

Also, in an embodiment, the processor of the display device 200 may map and display the image of the AR digital signage only for a floor corresponding to the destination of the vehicle when the vehicle approaches the building area of the destination. However, in some embodiments, when the destination POI information indicates a high level floor, only the AR digital signage corresponding to the destination POI information may be displayed in the display area in order to secure visibility.

Referring to another example of FIG. 17B, when the building area 1700 is obscured by a nearby structure, for example, a tree and the visibility of the signage is not secured, an example in which floorwise pieces of AR digital signage 1731 and 1732 are mapped on the surface of an adjacent driving road is shown.

Here, the icon 1710 indicating the building location is also displayed, and one or more lines (e.g., a dotted line) indicating the relationship between the pieces of AR digital signage 1731 and 1732 displayed on the surface is also displayed. Thus, it is possible for the driver to intuitively perceive locations associated with the pieces of AR digital signage 1731 and 1732.

In an embodiment, the processor of the display device 200 according to the present invention may monitor and detect whether at least a part of the building area in the driving image acquired through the vision sensor is out of the field of view of the camera of the vehicle or is not obscured by other structures.

To this end, the display device 200 receives camera sensing data from the vehicle 100 through the communication unit in real time and transmits the monitoring and detection result to the digital signage platform providing system. The display device 200 may determine whether to display the AR digital signage at a location other than the building on the basis of the rendering result received from the digital signage platform providing system.

Although not shown, when the vehicle approaches or enters the building area 1700 in the display state of FIG. 17B, the pieces of AR digital signage 1731 and 1732 may be displayed together with an AR object that informs the driver of the entry.

Subsequently, referring to FIG. 17C, in the case of a high-rise building 1701 associated with a plurality of pieces of POI information, for example, a shopping mall complex, the display device 200 may display floorwise digital AR digital signage 1750 in a void area 1750 in order to secure more visibility, instead of displaying the AR digital signage on the front side and/or the lateral side of the corresponding building on a floor-by-floor basis.

Here, the void area 1750 may be designated as a display area that Is not currently displaying structures or objects which affect safe driving, for example display areas displaying only the sky, a far off building, or other structure-free display areas that do not affect safe driving. Also, the floorwise digital signage 1750 may be displayed to be closely aligned with an edge of the driving image so as not to overlap with other driving-related information (e.g., route guidance, driving speed display, etc.) in the driving image. Also, in some embodiments, the floorwise digital signage 1750 may include only floorwise guidance information, not content related to floorwise detailed POI information.

Also in FIG. 17C, one or more lines (e.g., a dotted line) connecting the relationship between the icon 1710 indicating the location of the building and the floorwise digital signage 1750 may be displayed. Thus, even if the display of the floorwise digital signage 1750 is changed to another void area based on the driving of the vehicle, it is possible for the driver to intuitively perceive the building with which the content is associated.

Figure 18:
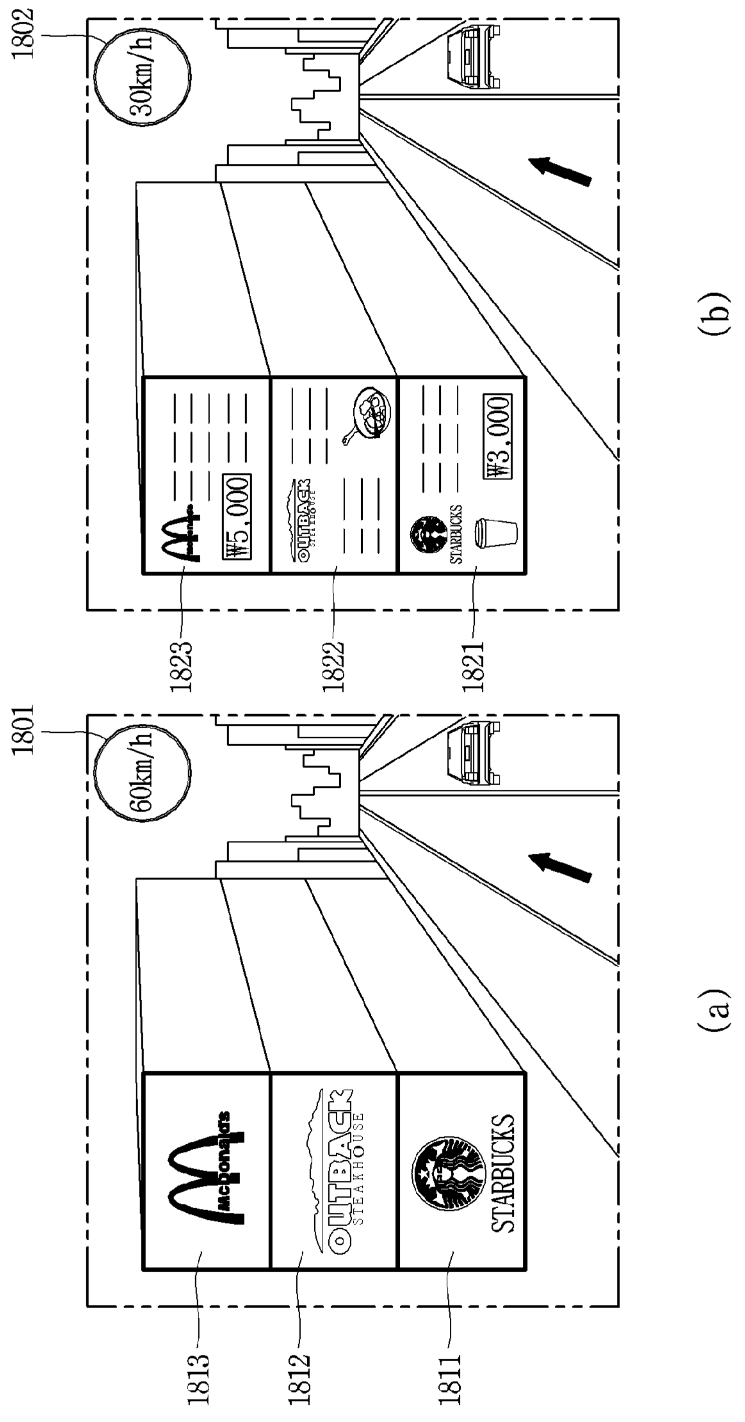
FIG. 18 is a diagram illustrating a method of varying information included in floorwise AR digital signage on the basis of the driving speed and driving direction of a vehicle according to an embodiment of the present invention.

FIG. 18 is a diagram illustrating a method of changing information included in floorwise AR digital signage on the basis of the driving speed and driving direction of a vehicle according to an embodiment of the present invention.

In this embodiment, a method of varying the amount or level of content displayed in the AR digital signage is considered by determining whether to attempt more active and detailed advertising exposure or provide only simple information on the basis of the driving speed, driving direction, and a change in distance of the vehicle from a building while the floorwise AR digital signage is being provided.

In an embodiment, the processor of the display device 200 may map the amount of content information included in the image of the AR digital signage to the driving image so that it varies based on the driving speed of the vehicle.

As shown in FIG. 18A, when the vehicle is driven (1801) at a reference speed (e.g., 40 km/h) or higher, the processor of the display device 200 may configure a plurality of pieces of AR digital signage 1811, 1812, and 1813 mapped to the display area of the building area to include simplified types of content. To this end, the display device 200 may receive driving-related information including the driving speed and driving direction of the vehicle by communication with the vehicle and may provide the related information to the digital signage platform providing system so that a content type and amount to be displayed is determined based on the information.

In an embodiment, the configuring of AR digital signage to include simplified types of content may refer to configuring AR digital signage by reducing the advertising service level or configuring AR digital signage in the form of an icon or symbol or by increasing the size of text (font). In an embodiment, the processor of the display device 200 may determine whether the vehicle is driven at a high speed greater than or equal to a critical speed and may configure the AR digital signage to include simplified types of content in response to the determination. Here, the critical speed may be dynamically varied in consideration of the type of driving road (e.g., a highway or a protected zone with a speed limit, etc.), the number of lanes on a road on which the vehicle is driven, real-time traffic information, etc.

As shown in FIG. 18B, when it is detected that the vehicle is driven (1802) at a speed less than the reference speed (e.g., 40 km/h) as a result of receiving real-time driving-related information, the processor of the display device 200 may configure and map a plurality of pieces of AR digital signage 1811, 1812, and 1813 to include more information with greater detail or specific types of content. In other words, when the driving speed of the vehicle is slowed, the advertising level may be increased so that more information is displayed in the pieces of AR digital signage 1811, 1812, and 1813 or additional information is consecutively displayed.

In an embodiment, the configuring of AR digital signage to include specific types of content may refer to configuring AR digital signage by increasing the advertising service level or configuring AR digital signage by including various advertisements or events or by decreasing the size of text (font) and increasing the amount of information displayed at once. In an embodiment, the processor of the display device 200 may determine whether the vehicle is driven at a low speed less than a critical speed and may configure the AR digital signage to include specific types of content in response to the determination. Here, the critical speed may be dynamically varied in consideration of the type of driving road (e.g., a highway or a protected zone with a speed limit, etc.), the number of lanes on a road on which the vehicle is driven, real-time traffic information, etc.

In an embodiment, the amount of content information included in the image of the AR digital signage may also be varied based on whether the vehicle approaches the building area. For example, the processor of the display device 200 may determine whether the distance between the current location of the vehicle and a building is less than a critical value on the basis of the driving image acquired through the vision sensor and the sensing data of the vehicle and may vary the amount of information and a content type to be included in the AR digital signage on the basis of the determination. For example, when the distance between the current location of the vehicle and the building is greater than or equal to the critical value, the processor of the display device 200 may configure the AR digital signage with a simple type of content or a lower level or amount of information. For example, when it is determined that the current location of the vehicle is gradually approaching the building, the processor of the display device 200 may variably configure the AR digital signage such that a plurality of pieces of content are sequentially displayed.

Figure 19:
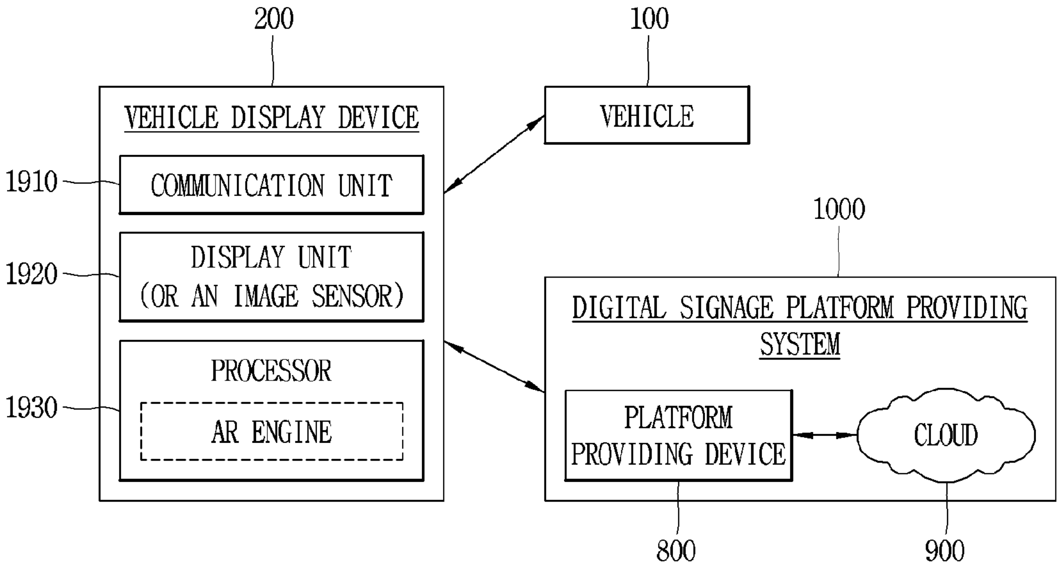
FIG. 19 is a diagram illustrating that a display device communicates with a vehicle and a digital signage platform providing system according to an embodiment of the present invention.

FIG. 19 is a diagram illustrating that a display device 200 according to an embodiment of the present invention communicates with a vehicle 100 and a digital signage platform providing system.

In FIG. 19, the display device 200 according to the present invention may include a communication unit 1910, a display unit (or an image sensor) 1920, and a processor 1930. The digital signage platform providing system 1000 may include a platform providing device 800 and one or more cloud networks or cloud devices (cloud) 900 for communicating with the platform providing device 800.

The display device 200 may receive the sensing data of the vehicle from a system such as a sensor, a vehicular electronic device, and an advanced driver assistance system (ADAS) provided in the vehicle 100 through the communication unit 1910.

The display device 200 may transmit the sensing data of the vehicle to the digital signage platform providing system 1000 through the communication unit 1910 and may receive POI information associated with the sensing data of the vehicle. To this end, the digital signage platform providing device 800 and the cloud 900 may be communicatively connected to each other.

The display unit 1920 of the display device 200 displays a driving image acquired through a vision sensor (e.g., a camera, an image laser sensor, etc.) of the vehicle. The processor 1930 of the display device 200 transmits information related to the driving image to the digital signage platform providing system 1000 through the communication unit 1910.

The digital signage platform providing system 1000 may perform information filtering and processing to perform merging for generating the AR digital signage on a floor-by-floor basis on the basis of the sensing data of the vehicle received from the vehicle 100, map information associated with the sensing data of the vehicle collected from the cloud 900, POI information, the spatial location of the building including a plurality of pieces of POI information, floor number information, POI-related advertisement information, and information on the driving image received through the display device 200, and the like and may transmit the merging result to the display device 200.

The display device 200 may receive a result of a rendering request that is for generating the AR digital signage on a floor-by-floor basis and that is received from the digital signage platform providing system 1000 and may map the AR digital signage to the building in the driving image on a floor-by-floor basis through the processor 1930. To this end, the processor 1930 may be embedded in or interoperable with an AR engine.

The display device 200 may vary the display area to which the floorwise AR digital signage is to be mapped on the basis of the shape of the image of the building in the driving image acquired through the vision sensor and the sensing data of the vehicle 100 received from the vehicle 100 (the current location, the driving speed, and the driving direction of the vehicle). For example, the display device 200 may vary the display area from the lateral side of the building area in the driving image to the front side and map the AR digital signage on a floor-by-floor basis on the basis of the driving speed of the vehicle and the distance between the current location of the vehicle and the current location of the building.

The display device 200 may transmit information on the varied display area to the digital signage platform providing system 1000 and may receive the sensing data of the vehicle from the vehicle 100 in real time and vary the display area in real time. Here, the varied display area may be determined to be a location other than the building area in the driving image so as to secure visibility, and the other location may be, for example, a road edge adjacent to the building area, a guard rail, or a sidewalk adjacent to the building area, and the surface of a driving road.

As described above, according to some embodiments of the present invention, by mapping augmented reality (AR) signage to a building in a driving image and displaying the AR signage to be closely similar to a real billboard, it is possible to solve the awkwardness caused by artificially displaying an AR object on a driving route screen in a conventional manner. Also, it is possible to solve the conventional limitation of displaying only one advertisement in one area even if AR technology is used, and thus advantageously, it is possible to provide extensibility for providing a plurality of various advertisements to one building. Also, even after the AR digital signage is mapped to the display area of the building on a floor-by-floor basis, it is possible to flexibly reflect the shape of a building based on a driver's view, a driving situation of a vehicle, preference, and nearby traffic and structural environments to vary the location of the display area. Accordingly, it is possible to enhance the visibility of the displayed AR digital signage. Furthermore, by varying the amount of or the display method for information provided through AR digital signage based on service levels, user preferences, and environmental changes due to vehicle driving, it is possible to more effectively display advertisement information. For example, by providing a more detailed and active advertisement when a vehicle approaches a building on which AR digital signage is displayed, or to increase the level or amount of information based on the vehicle being stopped or driven at a low speed, it is possible to maximize an advertising effect.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A display device linked to a vehicle, the display device comprising:

a transceiver and receiver configured to communicate with a digital signage platform providing system communicating with a server;

a display configured to display a driving image of the vehicle acquired through a camera; and a processor configured to receive sensing data of the vehicle and transmit to the digital signage platform providing system, via the transceiver and receiver, a request for point of interest (POI) information based on the sensing data, wherein the processor is further configured to:

recognize a spatial location of a building associated with a plurality of POI information;

transmit a rendering request for generating augmented reality (AR) digital signage corresponding to the plurality of POI information on a floor-by-floor basis, to the digital signage platform providing system;

receive a rendering result comprising the generated AR digital signage, wherein the AR digital signage is generated based on the sensing data of the vehicle, the spatial location of the building, and floor number information of the plurality of POI information;

cause the display to display the driving image having the AR digital signage mapped to a display area in the driving image; and in response to the display area being changed in the driving image, transmit information to the digital signage platform providing system related to the changed display area and receive an updated rendering result for mapping the AR digital signage to the changed display area in the driving image, wherein the processor is further configured to:

identify an entrance side of the building as a front side and a side of the building which is opposite to the front side as a rear side, and identify lateral sides of the building by excluding the front side and the rear side;

determine one of the front, rear, or lateral sides of the building included in the driving image as the side of the building that includes the display area to which the AR digital signage is to be mapped, based on areas in the driving image of each identified side of the building;

display the AR digital signage in the display area of the determined sides of the building; and when the area of the display area to which the AR digital signage is mapped in the driving image changes according to the driving of the vehicle, change the display area where the AR digital signage is mapped such that the display area corresponds to a different side of the building according to the area of each side of the building included in the driving image.

2. The display device of claim 1, wherein based on at least a portion of the building in the driving image not being recognized or being out of a field of view of the camera, the AR digital signage is displayed to be mapped to another object or structure in the driving image.

3. The display device of claim 1, wherein the display area is changed based on the sensing data of the vehicle while the vehicle is being driven.

4. The display device of claim 1, wherein the display area is changed based on changes to respective areas of a front side and a lateral side of the building in the driving image while the vehicle is being driven, and wherein the display area is changed from one side of the building to another side of the building in the driving image.

5. The display device of claim 1, wherein the AR digital signage is displayed to gradually move from one side of the building to another side of the building in the driving image according to a driving direction and driving speed of the vehicle.

6. The display device of claim 1, wherein an amount of content information included in the AR digital signage is based on a driving speed of the vehicle.

7. The display device of claim 1, wherein an amount of content information included in the AR digital signage is varied based on a determination that the vehicle is approaching the building based on the driving image.

8. The display device of claim 1, wherein:

one of the plurality of POI information includes pre-registered preference POI information provided to the digital signage platform providing system, and the processor is further configured to:

display AR digital signage corresponding to the pre-registered preference POI information on an entire side of the building as the display area in the driving image; and display AR digital signage of a plurality of non-pre-registered preference POI information on a floor by floor basis on another side of the building in the driving image.

9. The display device of claim 1, wherein the processor is further configured to:

transmit information on a destination of the vehicle to the digital signage platform providing system, and display AR digital signage corresponding to the destination to be visually distinct from other AR digital signage in the driving image.

10. The display device of claim 9, wherein only AR digital signage for a floor number corresponding to the destination is displayed in the driving image as the vehicle approaches the building.

11. An operating method of a display device linked to a vehicle, the operating method comprising:

transmitting a request for point of interest (POI) information based on sensing data of the vehicle to an augmented reality (AR) digital signage platform providing system;

recognizing a spatial location of a building associated with a plurality of POI information;

transmitting, to the AR digital signage platform providing system, a rendering request for generating AR digital signage corresponding to the plurality of POI information on a floor-by-floor basis;

receiving a rendering result comprising the generated AR digital signage, wherein the AR digital signage is generated based on the sensing data of the vehicle, the spatial location of the building, and floor number information of the plurality of POI information;

displaying a driving image acquired through a camera having the AR digital signage mapped to a display area in the driving image; and in response to the display area being changed in the driving image, transmitting, to the digital signage platform providing system, information related to the changed display area and receiving an updated rendering result for mapping the AR digital signage to the changed display area in the driving image, wherein the recognizing a spatial location of a building further comprises identifying an entrance side of the building as a front side and a side of the building which is opposite to the front side as a rear side, and identifying lateral sides of the building by excluding the front side and the rear side, and, wherein the displaying the image to which the AR digital signage is mapped further comprises:

determining one of the front, rear, or lateral sides of the building included in the driving image as the side of the building that includes the display area to which the AR digital signage is to be mapped, based on areas in the driving image of each identified side of the building, displaying the AR digital signage in the display area of the determined sides of the building, and, wherein the receiving an updated rendering result further comprises changing the display area where the AR digital signage is mapped such that the display area corresponds to a different side of the building according to the area of each side of the building included in the driving image, when the area of the display area to which the AR digital signage is mapped in the driving image changes according to the driving of the vehicle.

12. The operating method of claim 11, wherein the transmitted information related to the changed display area relates to a distortion ratio of the image of the building in the driving image.

13. The operating method of claim 12, wherein based on at least a portion of the building in the driving image not being recognized or being out of a field of view of the camera, the AR digital signage is displayed to be mapped to another object or structure in the driving image.

14. The operating method of claim 11, wherein the display area is changed based on the sensing data of the vehicle obtained while the vehicle is being driven.

* * * * *